US 11,327,928 B2

United States Patent
Neylan et al.

(10) Patent No.: US 11,327,928 B2
(45) Date of Patent: May 10, 2022

(54) DYNAMIC DISPLAY OF FILE SECTIONS BASED ON USER IDENTITIES

(71) Applicant: MICROSOFT TECHNOLOGY LICENSING, LLC, Redmond, WA (US)

(72) Inventors: Catherine W. Neylan, Seattle, WA (US); Samuel Ying-Lam Cheung, Vancouver (CA); Peter Fintan Leonard, Seattle, WA (US); Liyin Xue, Kirkland, WA (US); Jennifer Michelstein Halberstam, Kirkland, WA (US); Erez Kikin-Gil, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 635 days.

(21) Appl. No.: 15/796,717

(22) Filed: Oct. 27, 2017

(65) Prior Publication Data

US 2019/0129968 A1 May 2, 2019

(51) Int. Cl.
*G06F 16/16* (2019.01)
*G06F 21/62* (2013.01)
(Continued)

(52) U.S. Cl.
CPC .......... *G06F 16/168* (2019.01); *G06F 3/0643* (2013.01); *G06F 16/164* (2019.01);
(Continued)

(58) Field of Classification Search
CPC .. G06F 16/168; G06F 40/197; G06F 21/6209; G06F 16/164; G06F 16/1767; G06F 3/0643; G06Q 10/103
(Continued)

(56) References Cited

U.S. PATENT DOCUMENTS 7,415,481 B2     8/2008  Becker et al.
7,913,167 B2 *   3/2011  Cottrille .............. G06F 21/6245
                                                         715/271
(Continued)

OTHER PUBLICATIONS

"International Search Report and Written Opinion Issued in PCT Application No. PCT/US2018/055767", dated Jan. 17, 2019, 11 Pages.

(Continued)

*Primary Examiner* — Michael Pham
(74) *Attorney, Agent, or Firm* — Newport IP, LLC; Leonard J. Hope

(57) ABSTRACT

A system for dynamically displaying specific sections of a file depending on a user identity is provided. The system utilizes access control data to enable an author to generate and share a file with a number of consumers and have each recipient view a customized set of sections of the file depending on access permissions associated with each recipient. The file can be in any format, e.g., a word processing document, presentation document, a media file, or any other file having a number of sections. A section of a file can be any definitive unit of data, such as a page, slide, tab, worksheet, video segment, audio segment, etc. Permissions can be based on a user's permission level, work history, skill level, role in an organization, title, etc. The system can also prevent access to certain sections of a file depending on the permissions associated with a consumer.

18 Claims, 23 Drawing Sheets

(51) Int. Cl.
*G06Q 10/10* (2012.01)
*G06F 40/197* (2020.01)
*G06F 16/176* (2019.01)
*G06F 3/06* (2006.01)

(52) U.S. Cl.
CPC ...... *G06F 16/1767* (2019.01); *G06F 21/6209* (2013.01); *G06F 40/197* (2020.01); *G06Q 10/103* (2013.01)

(58) Field of Classification Search
USPC .......................................................... 707/822
See application file for complete search history.

(56) References Cited

U.S. PATENT DOCUMENTS

| | | | | |
|---|---|---|---|---|
| 7,933,952 | B2* | 4/2011 | Parker | G06F 40/166 709/204 |
| 8,433,993 | B2 | 4/2013 | Weinberger et al. | |
| 9,483,457 | B2 | 11/2016 | Presler-Marshall et al. | |
| 2005/0154989 | A1* | 7/2005 | Maddocks | G06F 3/0482 715/735 |
| 2008/0215985 | A1 | 9/2008 | Batchelder et al. | |
| 2009/0025063 | A1* | 1/2009 | Thomas | G06F 21/6218 726/4 |
| 2013/0061154 | A1 | 3/2013 | Bennett | |
| 2013/0086460 | A1 | 4/2013 | Folting | |
| 2013/0097490 | A1* | 4/2013 | Kotler | G06F 40/166 715/255 |
| 2013/0124957 | A1 | 5/2013 | Oppenheimer | |
| 2014/0372850 | A1 | 12/2014 | Campbell et al. | |
| 2016/0342604 | A1 | 11/2016 | Link et al. | |
| 2017/0262619 | A1 | 9/2017 | Taneja et al. | |

OTHER PUBLICATIONS

"SharpCloud", Retrieved from <<http://www.sharpcloud.com/enterprise>>, May 19, 2016, 9 Pages.

"Office Action Issued in European Patent Application No. 18796318.6", dated Nov. 11, 2021, 8 Pages.

* cited by examiner

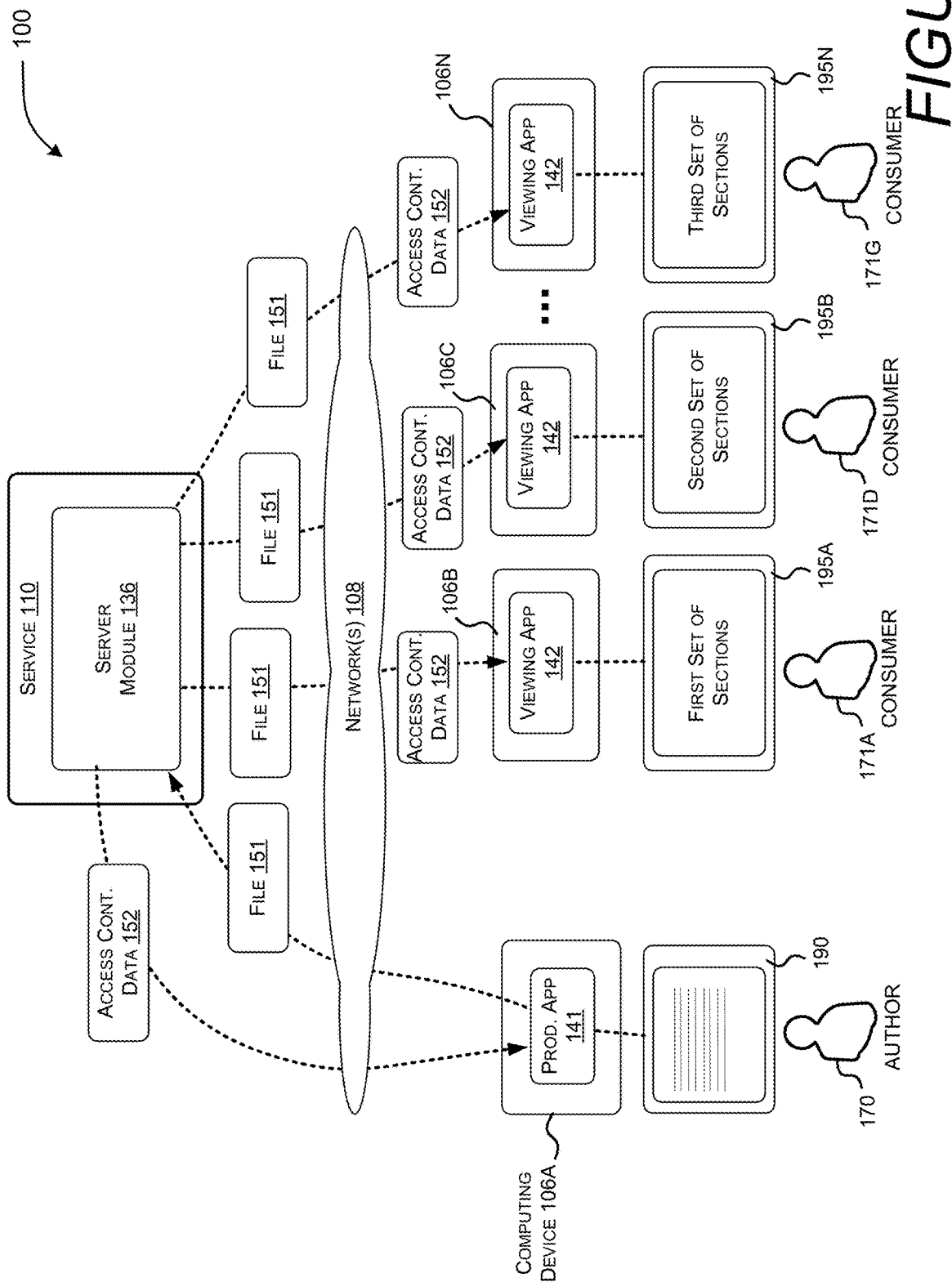

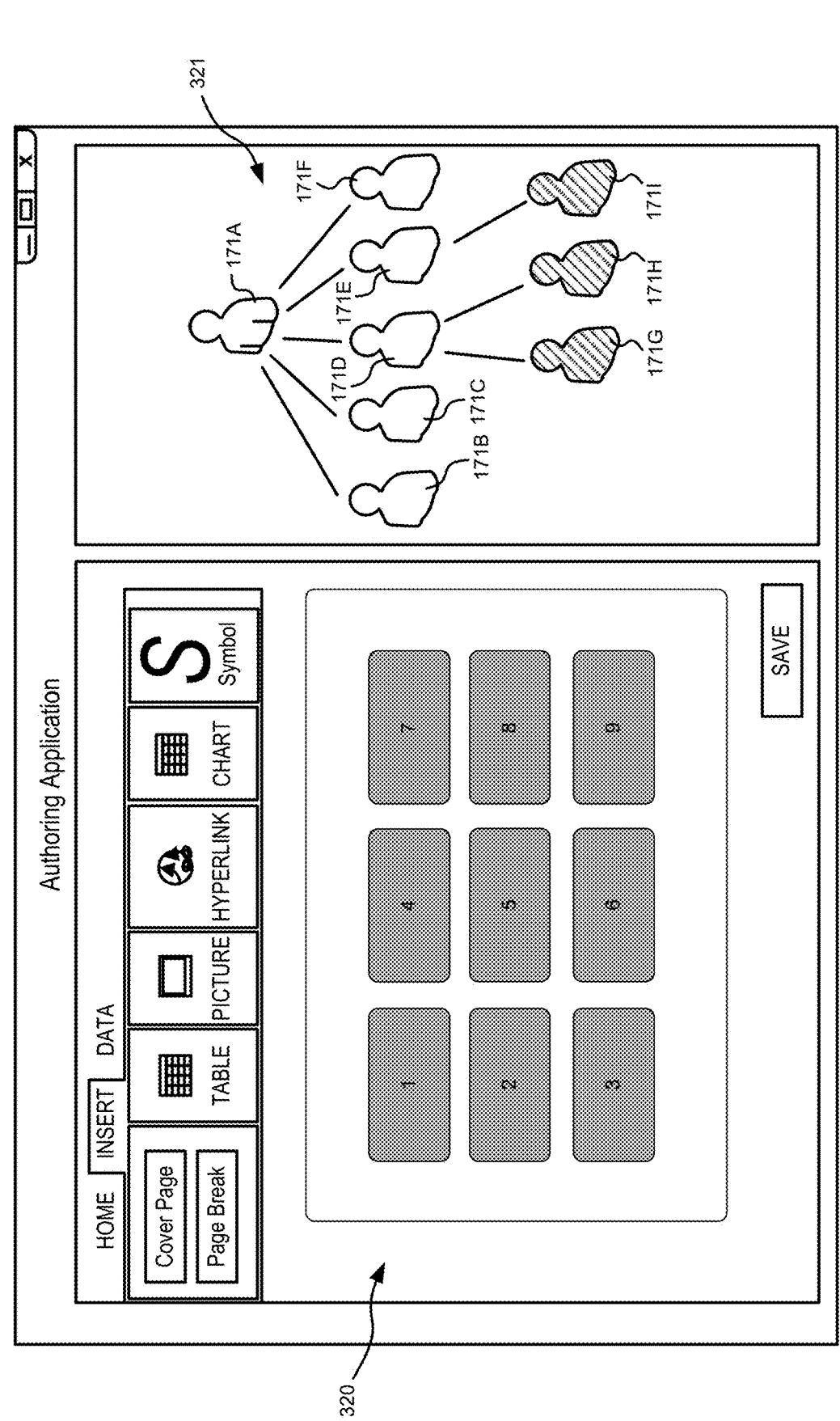

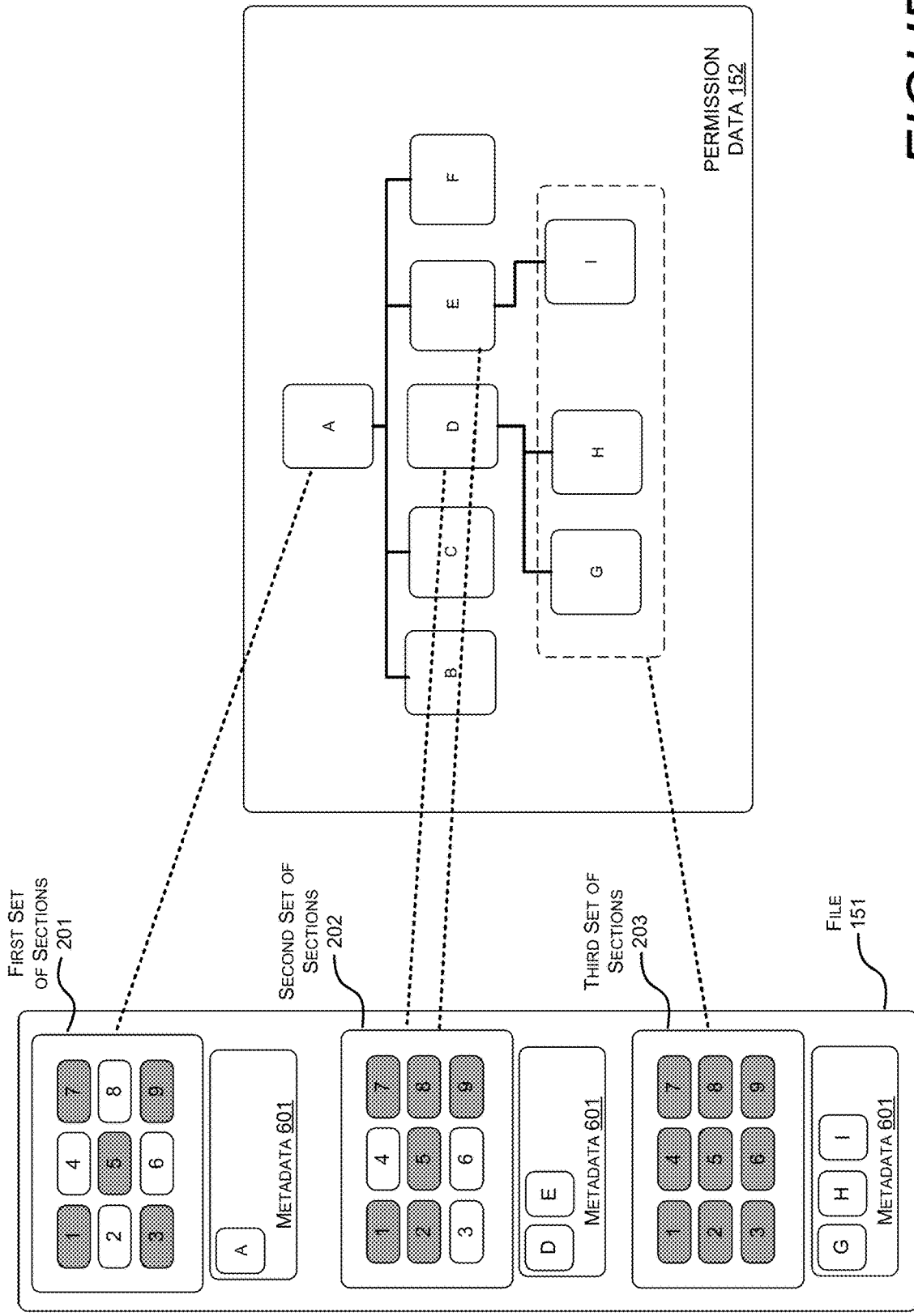

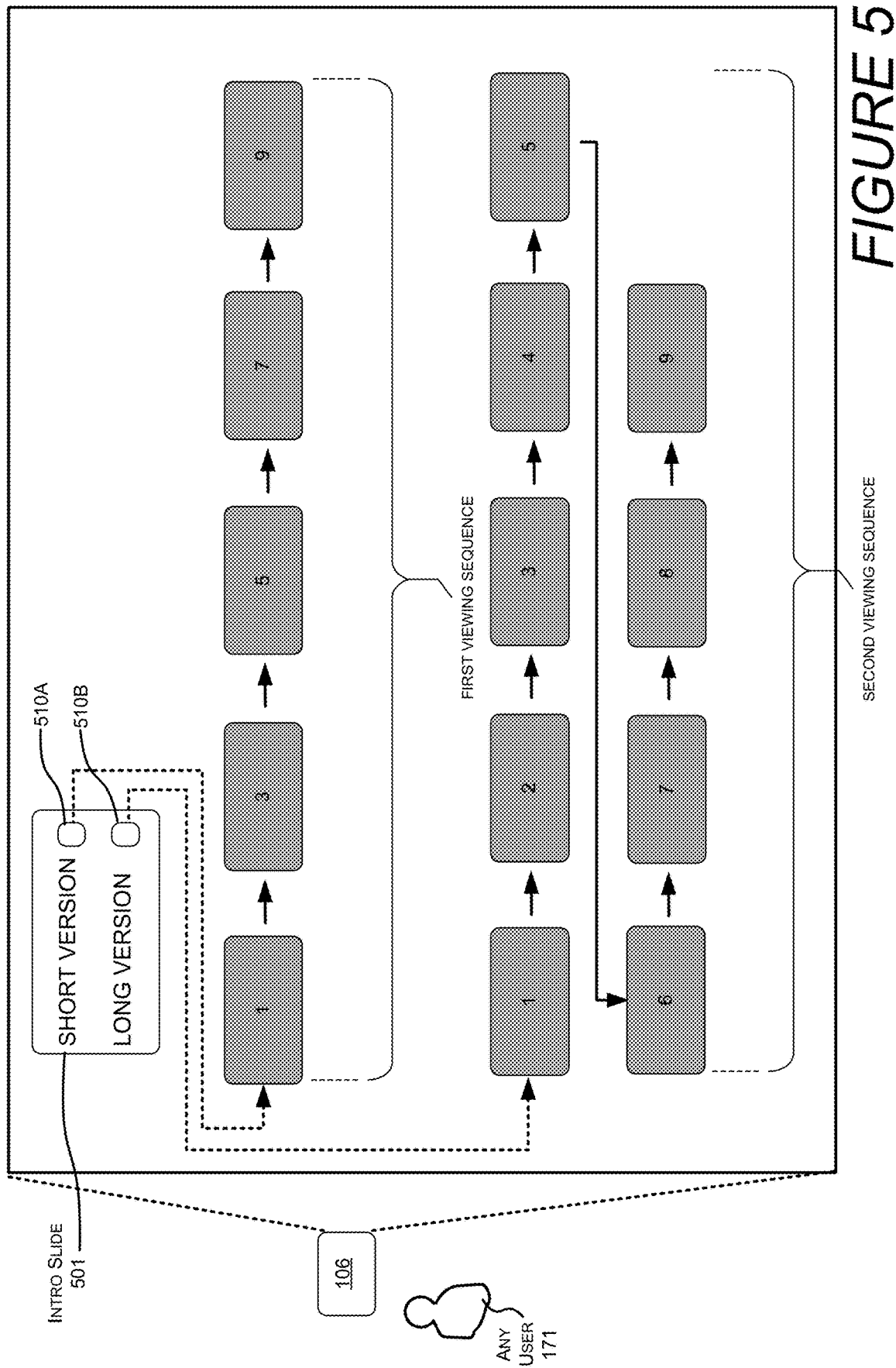

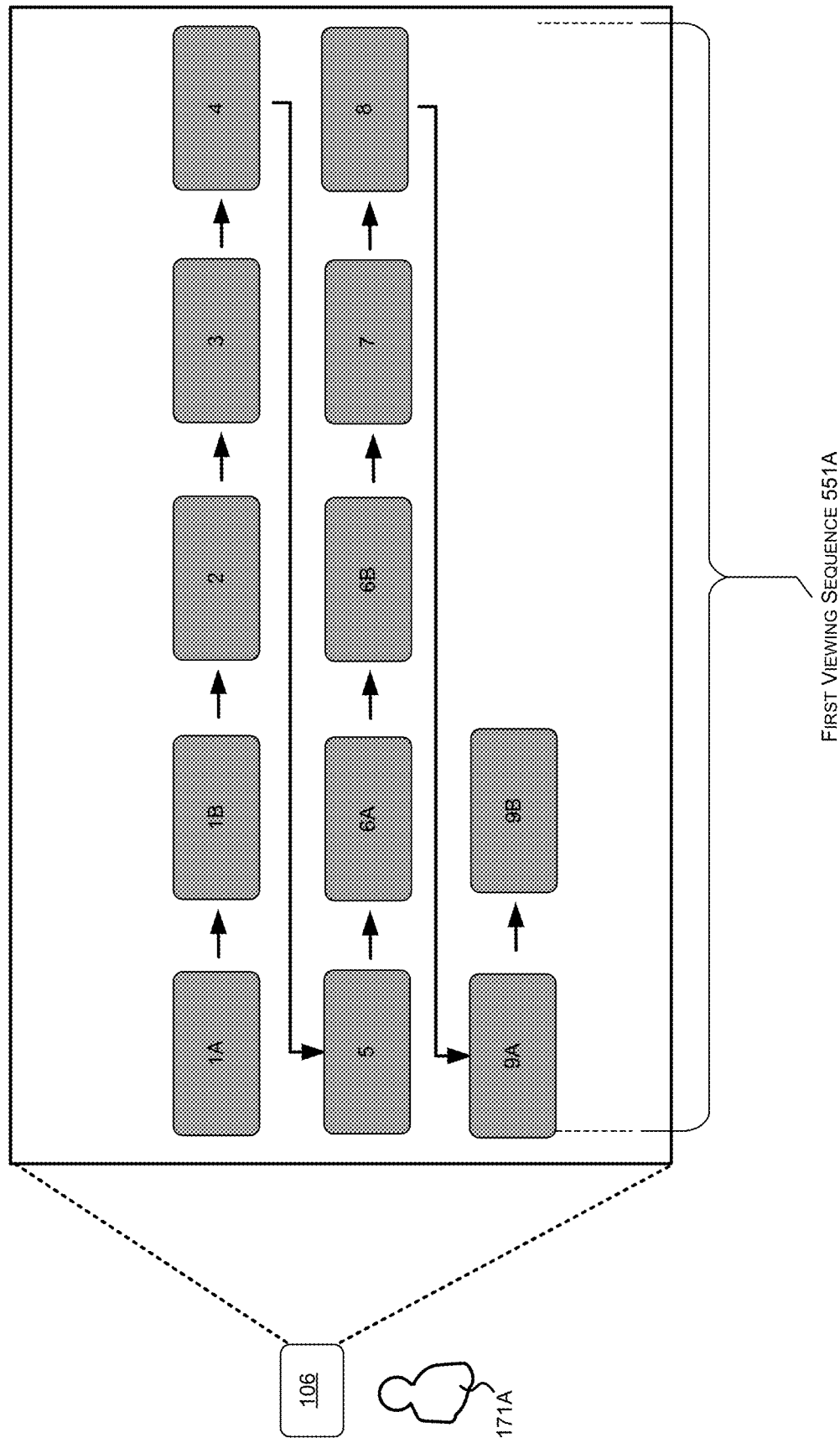

DYNAMIC DISPLAY OF FILE SECTIONS BASED ON USER IDENTITIES

BACKGROUND

Productivity files and media files are commonly used to share information in various formats. For example, some information can be shared as a standalone file using a word processing document, a presentation document, or a spreadsheet document. Although most existing file formats are effective for communicating and sharing information, most existing data formats are static in nature when it comes to how the content is presented. In most existing systems, when an author generates a document and that document is shared between multiple users, each recipient of the document sees identical versions of content. When the author desires to show different sections of a document to different users, or wishes to redact or deemphasize certain sections of a document for some users, the author is required to manually edit the document and then manage the distribution of different versions of the document to ensure that each recipient views the intended version.

In addition, most existing files do not have advanced security features that provide different levels of access to individual sections of a document. In most existing technologies, a user can protect a document through the use of an encryption technology. Although such security measures can protect the contents of a file, this all-or-nothing approach does not enable authors to control access to sections, e.g., pages, tabs, columns or rows of data, of a document at a granular level.

It is with respect to these and other considerations that the disclosure made herein is presented.

SUMMARY

The present invention enables a system to dynamically display specific sections of a file depending on an identity of a user viewing the file. In some embodiments, a system utilizes access control data, e.g., data defining permissions associated with user identities, to enable an author to generate and share a file with a number of recipients and have each recipient view different sections of the file depending upon access control permissions associated with each recipient. The file can be in any format, e.g., a word processing document, a presentation document, a media file, or any other file having a number of sections. For illustrative purposes, a section of a file can be any definitive unit of data, such as a page, side, tab, worksheet, column, row, video segment, audio segment, etc. In addition, a section of a file can be defined by text or data having a particular format, such as an annotation, a header, a footer, a footnote, column header, row header, etc. Permissions can be based on attributes associated with a user identity, such as a user's permission level, work history, skill level, role in an organization, title, etc. In some embodiments, the techniques disclosed herein can prevent access to certain sections of a file depending on the permissions associated with a consumer. Such features mitigate the risk of unintentional exposure of data when a file is inadvertently sent to the wrong user.

For example, consider a scenario where a presentation file is sent to a CEO, several managers, and several first-level programmers. A presentation file configured according to the techniques disclosed herein can automatically cause a display of one version of the presentation to be sent to the CEO, another version to the managers, and yet another version to the programmers. In such an example, the author of the presentation file only needs to generate and distribute one file. The CEO can see a higher-level version of the presentation, e.g., with fewer slides and higher-level bullet points, and other employees can see other versions of the presentation, e.g., a different set of slides, that is targeted for their respective levels of a given hierarchy. Thus, one copy of the file can be broadly distributed to multiple users with each recipient automatically viewing the appropriate version of the presentation depending on his/her permission level, work history, skill level, role, etc. In another example, a video file may have several segments of video; when the video is played by a first person in a company, the video file may cause a video player to display all video segments of the file. When the same video is played by other people, the video same file may cause a video player to only display certain segments, e.g., the first segment and last segment of the video file, selected for those other people.

In some embodiments, a system can allow authors of a document to control access to specific sections of the document based on a combination of factors enabling a more granular level of control of access to specific file sections. For example, when a document is sent to the CEO and three managers at the same level in an organization, the document can automatically display one version of the presentation to the CEO, and automatically display other unique versions to each of the three managers depending on each manager's role in the organization. For example, a general manager may see all slides of a presentation, a development manager may see a first subset of the slides, and a design manager may see a second subset of the slides. A viewing program, such as a word processing program or a presentation program, can automatically display certain sections of a document depending on a user's level in an organization as well as a user's role.

In some embodiments, access to sections of a file can be based on an "author-choice" paradigm or consumer-choice" paradigm. A system providing an author-choice paradigm enables the author to establish the permissions for consumers to access certain sections of a file, such as a presentation file, video file or audio file. For instance, an author can set access rights for a first-level employee to view the first 10 pages of a document and set access rights for a second-level employee to view the last 10 pages of the document. A system providing the consumer-choice paradigm gives the viewers options for selecting a particular set of sections. For instance, a document can give a consumer a choice to view a "short version" of a presentation or a "long version" of the presentation. In response to the consumer's selection, a viewing application can display a first set of sections when the short version is selected, and display a second set of sections when the long version is selected.

In some configurations, an author of a document can influence the consumer's viewing experience. For instance, an author can control a type of application a consumer utilizes to view a file based on the consumer's identity. In one illustrative example, one file can cause the execution of a word processing application for a CEO but cause the execution of a presentation program for other employees of an organization. Such configurations can utilize different applications to bring emphasis to certain sections using different formatting features.

In addition, the techniques disclosed herein can record consumer and author changes to a document based on a level of information about the document that is accessible to each user. Thus, edits and annotations by each user can also adhere to the access levels established by the techniques disclosed herein.

The techniques disclosed herein provide a user interface that enables an author to view and define access permissions for individual consumers or groups of consumers. The user interface can display access permissions for documents, sections of documents, or aspects of other files generated and managed by the author. The user interface can also enable the author to synthesize and view a semantic summary and a type of view the consumers will experience. For instance, the user interface can map the associations between particular consumer identities and specific applications.

In addition to providing a granular level of control to sections of a file, a system can change the layout of the content depending on a consumer's identity. For example, the order and format of file content can be set for a first consumer and another order and/or format can be set for a second consumer. Among many other benefits, a system can automatically display a layout that is optimal for a person's role or other characteristics while requiring minimal or no user input from the consumer. In one illustrative example, an electronic book may change a layout, displayed images, or use different words, depending on a work history of a user, a skill level, a role of an employee, etc. In another example, a video file can have a number of video clips that can be rearranged and modified based on a work history of a user, a skill level, a role of an employee, etc.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

FIG. 1 is a block diagram of a system for dynamically displaying sections of a document based on an identity of a user viewing the document.

FIG. 2C is a screenshot of a user interface mapping a second group of user identities with a third set of file sections.

FIG. 3 illustrates associations between user identities and sets of file sections.

FIG. 5 illustrates an example of a file providing a consumer-choice paradigm, where the file contains several viewing sequences and options for a consumer to select a particular viewing sequence.

FIG. 7A illustrates a first viewing sequence that is automatically displayed to a user associated with a first identity.

DETAILED DESCRIPTION

Figure 2A:
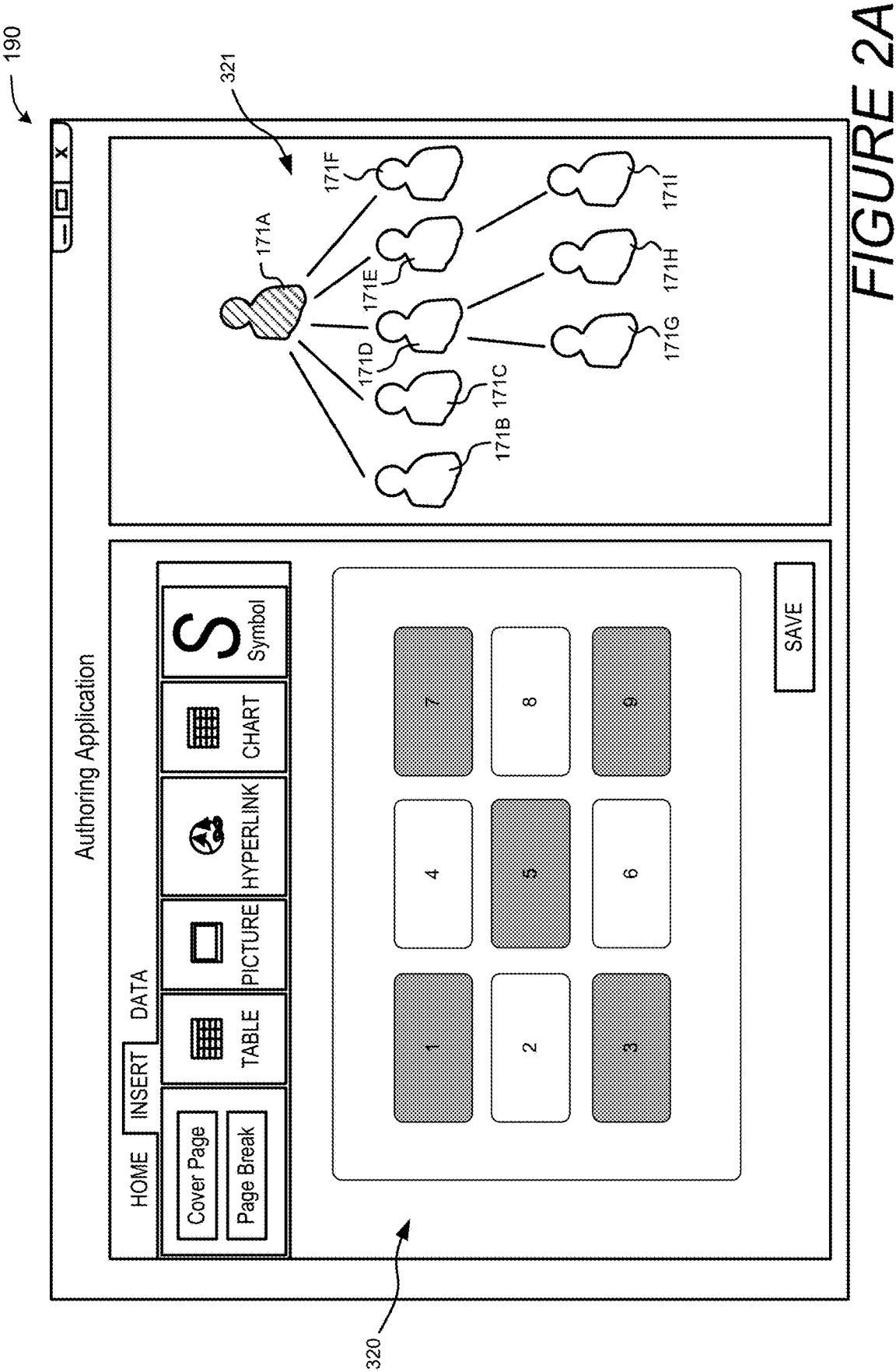
FIG. 2A is a screenshot of a user interface mapping a first user identity with a first set of file sections.

FIG. 1 illustrates a system 100 for dynamically displaying specific sections of a file 151 based on an identity of a user viewing the document. In some embodiments, the system 100 utilizes access control data 152, e.g., data defining permissions associated with user identities, to enable an author 170, to generate and share a file 151 with a number of consumers 171, and have individual consumers 171 view different sections of the file 151 depending on permissions associated with each consumer 171. The file 151 can be any suitable format, e.g., a word processing document, presentation document, an audio file, a video file, or any other file having a number of sections. For illustrative purposes, a section of a file 151 can be any definitive unit of data, such as a page, slide, tab, worksheet, column, row, video segment, audio segment, etc. In addition, a section of the document can be defined by text or data having a particular format, such as an annotation, a header, a footer, a footnote, etc. The access permissions for each file section can be based on attributes associated with a user identity, such as a user's permission level, work history, skill level, role in an organization, title, etc. In some embodiments, the techniques disclosed herein can prevent access to certain sections of a file 151 based on a consumer's permissions. Such features mitigate the risk of unintentional exposure of data when a file 151 is inadvertently sent to the wrong user.

A file 151 can be communicated to any number of computing devices 106 (106B-106N) associated with a consumer 171 (171A-171N) from a computing device 106A associated with an author 170. The file 151 can be communicated via a network 108, and in some instances, the file can be sent via a service, e.g., a storage service, an email service, etc. Each computing device 106B-106N associated with a consumer 171 can display sections of the file 151 on a user interface 195 (195A-195N) by the use of a viewing application 142. The viewing application 142 can be any suitable application such as a presentation program, a web browser, a media player, etc.

When viewing the contents of a file 151, a consumer 171 may receive access control data 152 to access sections of the file 151. In some configurations, the access control data 152 can be provided by a server module 136 of a service 110 and communicated to one or more computing devices 106.

In one illustrative example, consider a scenario where a presentation file is sent to a CEO, several managers, and several first-level programmers. A presentation file is configured to automatically cause a display of one version of the presentation having a first set of slides to the CEO, another version having a second set of sides to the managers, and yet another version having a third set of slides to the programmers. In such an example, the author 170 of the presentation file 151 only needs to generate and distribute one copy of the file 151, and the CEO can automatically view the first set of slides, and other employees can see versions of the presentation, e.g., the other sets of slides, that is targeted for their respective levels. One copy of the file 151 can be broadly distributed to multiple consumers 171 and based on metadata in the file 151; a viewing application 142 will automatically display select sets of slides to each consumer 171 depending on their permissions.

Figure 2B:
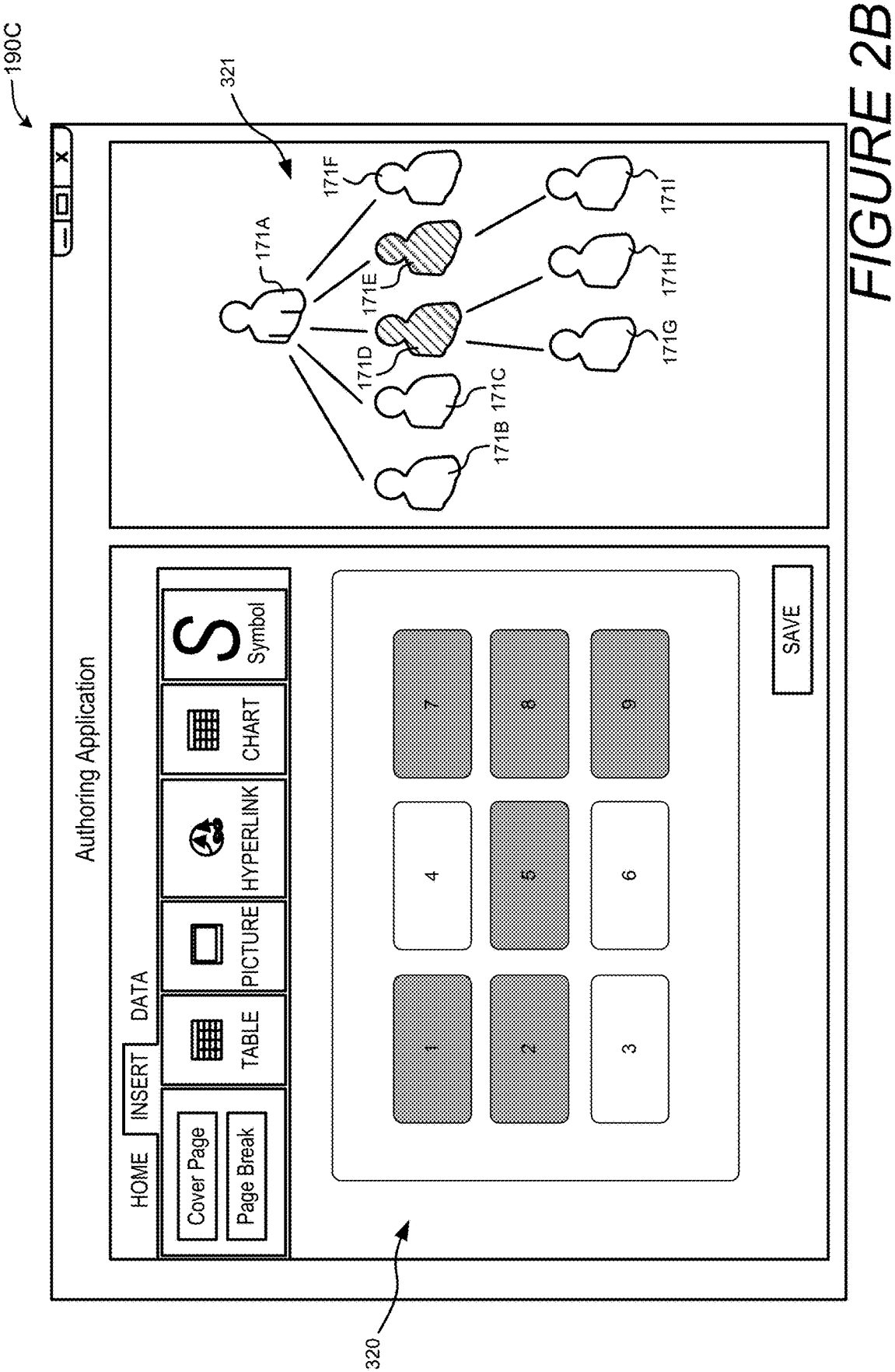
FIG. 2B is a screenshot of a user interface mapping a first group of user identities with a second set of file sections.

To facilitate aspects of the system 100, the techniques disclosed herein provide a file structure including metadata associating different sections of a file 151 with user identities and/or permissions. In addition, the techniques disclosed herein provide a user interface that enables an author 170 to view and define access permissions for individual consumers 171 or groups of consumers 171. The user interface provides graphical representations that show associations between sections of a file 151 and user identities of one or more consumers 171. Turning now to FIGS. 2A-2C, a number of screen shots illustrate aspects of a user interface 190 for mapping and configuring associations between file sections and user identities of consumers 171.

FIG. 2A illustrates a user interface 190 comprising a first pane 320 for displaying sections of a file 151. For illustrative purposes, each section is labeled as item 1 through 9. In addition, the user interface 190 comprises a second pane 321 for displaying representations of user identities. In this example, the representations of user identities include a first user 171A, a second user 171B, up to a ninth user 171I.

In some embodiments, graphical indicators can be utilized to show associations between a section of a file and one or more user identities. In this specific example, graphical highlights can be rendered when a user selects a section of the file and one or more user identities. The highlights can be toggled on or off when a user selects individual sections or individual user identities. To illustrate aspects of this disclosure, this example shows a scenario where the author 170 selects file sections 1, 3, 4, 7, and 9. In addition, the author selects the first consumer 171A. By making such selections, the author 170 associates the first consumer 171A with a first set of sections that includes sections 1, 3, 4, 7, and 9. Once the author is done defining the set of sections and making the associations with the user identities, the author can save the changes by providing a user input, such as an actuation of the "save" button. The associations can be saved as metadata to the file 151.

The author 170 can define any number of associations between the sections of a file 151 and one or more user identities. FIG. 2B continues the current example, where the author defines a second set of sections and associates the second set of sections with different user identities. More specifically, in this example the author 170 defines a second set of sections that includes sections 1, 2, 5, 7, 8, and 9. The author 170 also associates the second set of sections with the fourth consumer 171D and the fifth consumer 171E. In continuing the current example, as shown in FIG. 2C, the author 170 defines a third set of sections that includes all sections of the file 171. As shown, the author 170 also associates the third set of sections with three consumers, 171G, 171H, and 171I.

Figure 4A:
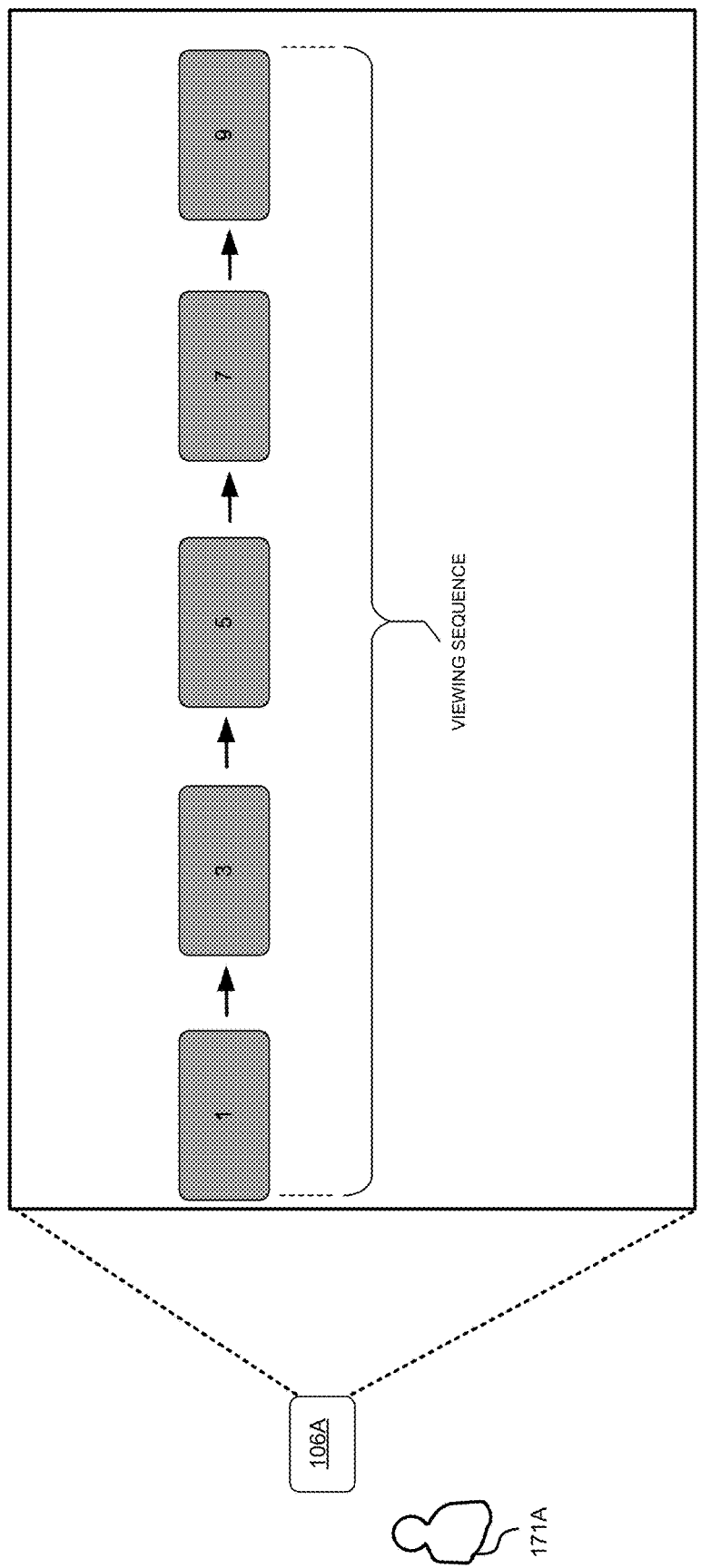
FIG. 4A illustrates a viewing sequence that is automatically displayed to a user associated with a first identity.
Figure 4B:
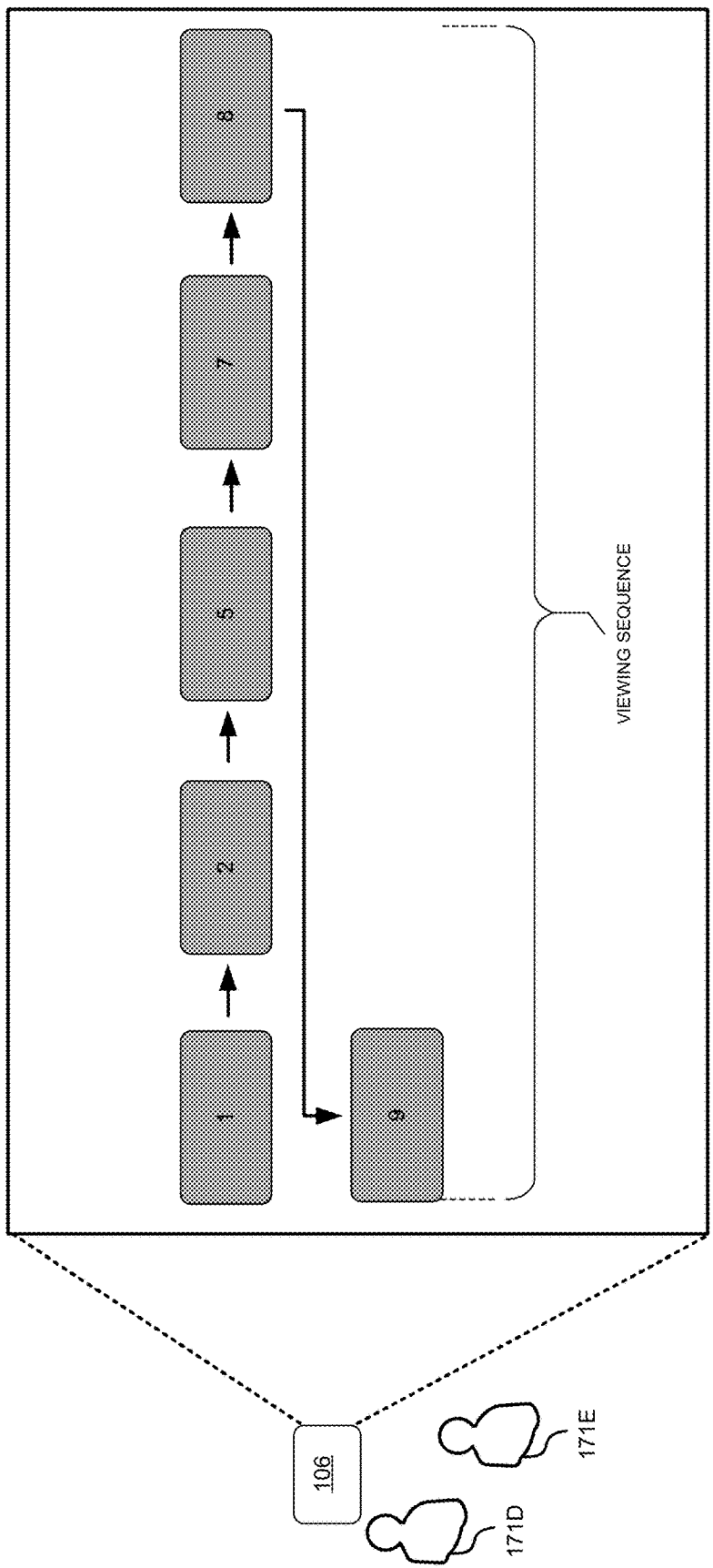
FIG. 4B illustrates a viewing sequence that is automatically displayed to a user associated with a first group of user identities.
Figure 4C:
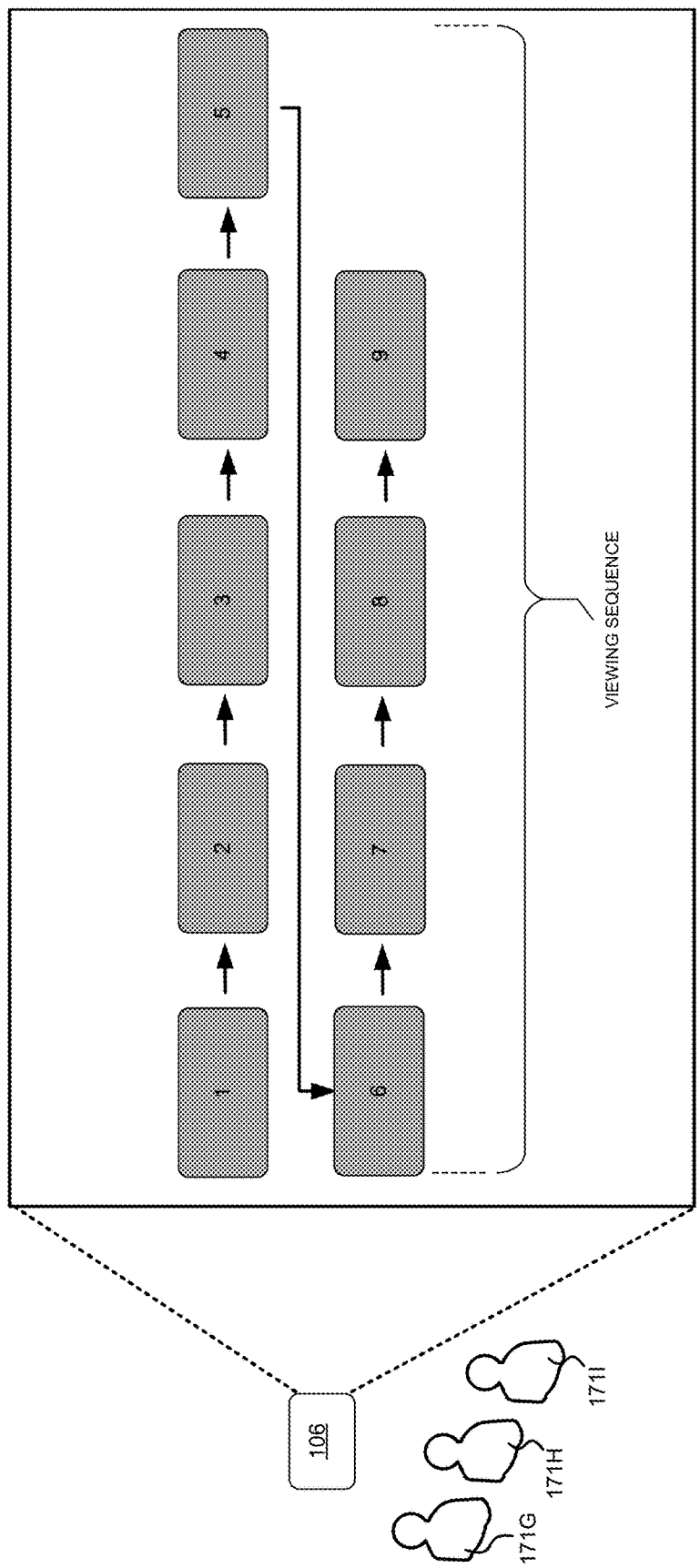
FIG. 4C illustrates a viewing sequence that is automatically displayed to a user associated with a second group of user identities.

As a result of the user input, one or more computing devices can generate metadata defining the associations between each set of sections and the various user identities. FIG. 3 illustrates one example of a file 151 comprising definitions for the set of sections and metadata associating the selected user identities with each set of sections. The example of FIG. 3 also shows the access control 152 in the form of an organizational chart. The access control 152 can include a number of different attributes associated with each user identity. For instance, the access control 152 can define a hierarchy of an organization, titles for each user identity, roles for each user identity, etc. As summarized above, a file 151 configured in accordance with the techniques disclosed herein can cause a viewing application, such as a presentation application or a word processing application, to automatically display different sets of file sections for different users. The file 151 is configured to minimize user interaction needed to view sections that are targeted for a particular person. FIGS. 4A-4C illustrate viewing sequences that can be automatically displayed to a user based on their user identity. For illustrative purposes, the examples shown in FIG. 4A-4C continue the example of the file 151 shown in FIG. 3.

FIG. 4A illustrates a viewing sequence that is automatically displayed to a user associated with the first identity 171A. As shown, as a user associated with the first identity 171A scrolls, paginates, or otherwise progresses through sections of the file 151, viewing application 142 only displays sections 1, 3, 5, 7, and 9. The other sections can be blocked or deemphasized when the file 151 is accessed by the user associated with the first identity 171A. Sections may be deemphasized by moving the sections to the end of the sequence, displayed in smaller text, or otherwise formatted in a way that brings highlight or emphasis to the sections that are selected for display, e.g., sections 1, 3, 5, 7, and 9.

FIG. 4B illustrates a viewing sequence that is automatically displayed to users associated with the fourth consumer 171D and the fifth consumer 171E. As shown, as these users scroll, paginate, or otherwise progress through sections of the file 151, a viewing application 142 only displays sections 1, 2, 5, 7, 8 and 9. The other sections can be blocked or deemphasized when the file 151 is accessed by the users associated with the fourth consumer 171D and the fifth consumer 171E.

FIG. 4C illustrates a viewing sequence that is automatically displayed to users associated with the seventh consumer 171G, eighth consumer 171H and the ninth consumer 171I. As shown, as these users scroll, paginate, or otherwise progress through sections of the file 151, a viewing application 142 displays all nine sections 1-9 of the file 151. Also, for these users, no sections are blocked or deemphasized when the file 151 is accessed by this group of users.

As summarized above, access to sections of a file 151 can be based on an "author-choice" paradigm or consumer-choice" paradigm. A system providing an author-choice paradigm enables the author to establish the permissions for consumers to access certain sections of a file, such as a presentation file, video file or audio file. For instance, an author can set access rights for a first-level employee to view the first 10 pages of a document and set access rights for a second-level employee to view the last 10 pages of the document. The examples above illustrate user interfaces, file formats and other mechanisms for facilitating "author-choice" paradigms.

A system providing the consumer-choice paradigm gives the viewers options for selecting a particular set of sections. For instance, a document can give a consumer a choice to view a "short version" of a presentation or a "long version" of the presentation. In response to the consumer's selection, a viewing application can display a first set of sections when the short version is selected, and display a second set of sections when the long version is selected. In some configurations, the selection of a set of sections can be based on length of time. For example, an author can configure a short version of a presentation by indicating one or more time thresholds, e.g., the two-minute version. By the use of a time threshold indicated by an author, a predetermined number of sections may be selected for a set of sections. For instance, a set of high priority sections or high-level sections may be selected for a "two-minute version" of a presentation.

In addition, a consumer can also indicate a set of sections they wish to view based on a length of time. For instance, an introduction slide of the presentation can prompt the consumer to indicate an amount of time, e.g., select a two-minute version of a presentation, a five-minute version of a presentation, etc. Based on the consumer's selection, a set of sections can be selected and automatically displayed to the consumer. For instance, a set of high priority sections or high-level sections may be selected for a "two-minute version" of a presentation, and more sections or all sections can be selected and displayed for longer time periods indicated by the consumer.

FIG. 5 illustrates an example implementation of a consumer-choice paradigm. In this example, a file has two or more viewing sequences. In addition, the file 151 comprises an introduction section, such as an introduction slide 501, that is displayed to a consumer 171 viewing the file 151. In some configurations, upon opening the file 151, the introduction section is displayed to the consumer 171. The introduction section can include selectable elements 510A and 510B each corresponding to unique viewing sequences defined in the file 151.

In this example, the first selectable element 510A corresponds to a first viewing sequence and the second selectable element 510B corresponds to a second of a sequence. In response to a user selection of the first selectable element 510A, a viewing application can display a sequence of sections including sections 1, 3, 5, 7 and 9. In response to a user selection of the second selectable element 510B, a viewing application can display sequence of sections including all sections of the file 151.

In some embodiments, a system can allow authors 170 of a file 151 to control access to specific sections of the file 151 at a granular level. For example, when a file 151 is sent to the CEO and three managers at a same level in an organization, the file 151 can provide one version of the presentation to the CEO, and other versions that are unique to each manager depending on their roles in the organization. For example, a general manager may see all slides of a presentation, a development manager may see a first subset of the slides, and a design manager may see a second subset of slides. A viewing program, such as a word processing program or a presentation program, can automatically display certain sections of a document depending on a user's level in an organization as well as the user's role. As will be described in more detail below, the viewing program can also display a semantic summary of the contents.

In addition to providing a granular level of control to sections of a file, the system 100 can change the layout of the content of a file 151 depending on user identity. For example, the order and format of the content can change dynamically based on an identity of a user viewing the document. Among many other benefits, a system 100 can automatically display a layout that is optimal for a person's role or other characteristics while requiring minimal or no user input from the viewer. In one illustrative example, an electronic book may change a layout, displayed images, or use different words, depending on a work history of a user, a skill level, a role of an employee, etc. In another example, a video file can have a number of video segments that can be rearranged and modified based on a work history of a user, a skill level, a role of an employee, etc.

Figure 6A:
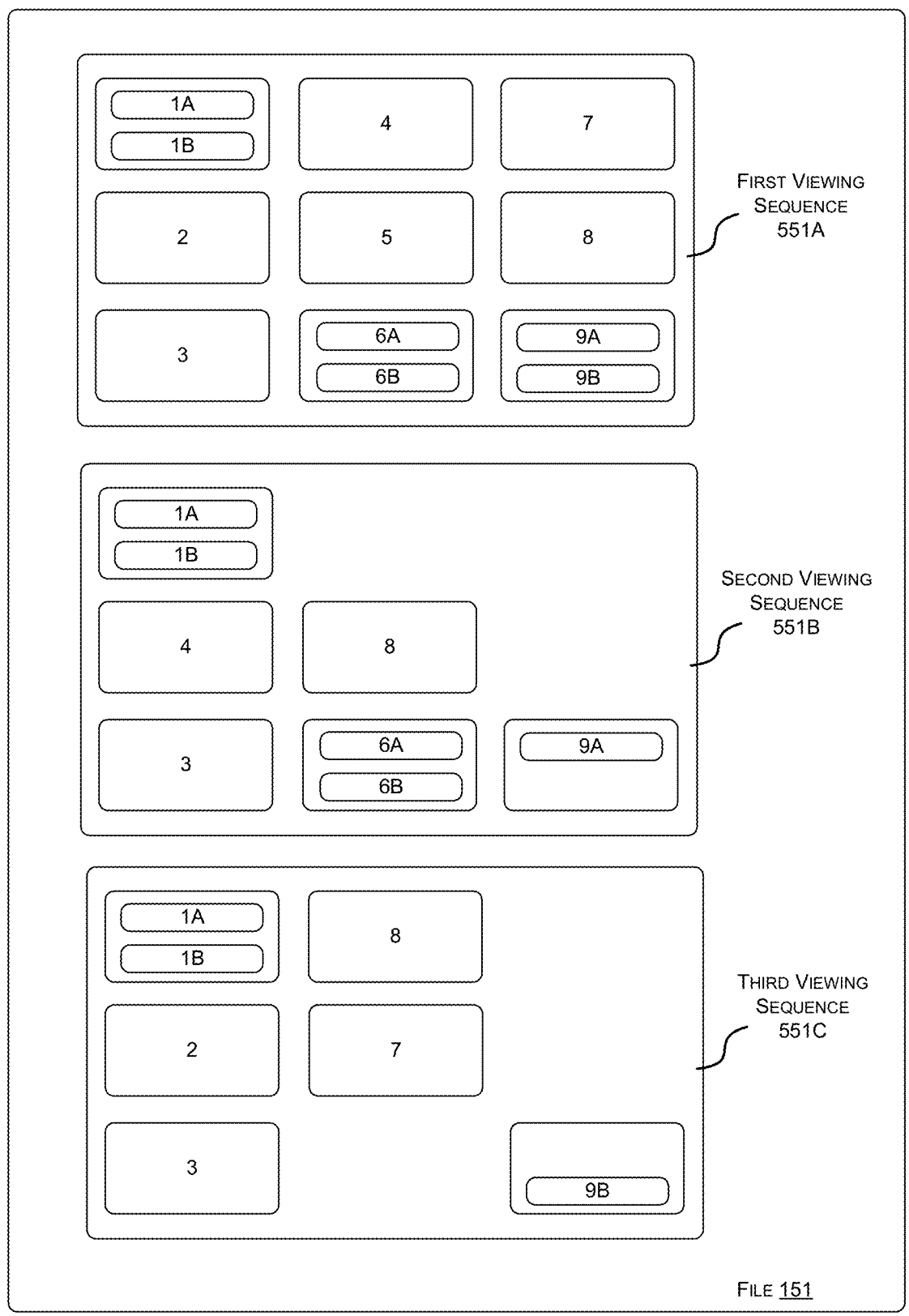
FIG. 6A illustrates a representation of a file having several viewing sequences of content.

To facilitate aspects of such features, a file 151 can comprise a plurality of viewing sequences. FIG. 6A illustrates one example of a file 151 having a first viewing sequence 551A, a second viewing sequence 551B, and a third viewing sequence 551C. As shown, each sequence may comprise a different set of sections having a different order of sections.

In this example, a first viewing sequence 551A comprises nine sections in the following order: section 1A, section 1B, section 2, section 3, section 4, section 5, section 6A, section 6B, section 7, section 8, section 9A and section 9B. The second viewing sequence 551B comprises sections in the following order: section 1A, section 1B, section 4, section 3, section 8, section 6A, section 6B, and section 9A. The third viewing sequence 551C comprises sections in the following order: section 1A, section 1B, section 2, section 3, section 8, section 7, and section 9B. These examples are provided for illustrative purposes and are not to be construed as limiting. It can be appreciated that a file 151 can include any number of sequences and the sections can be arranged in any order.

Figure 6B:
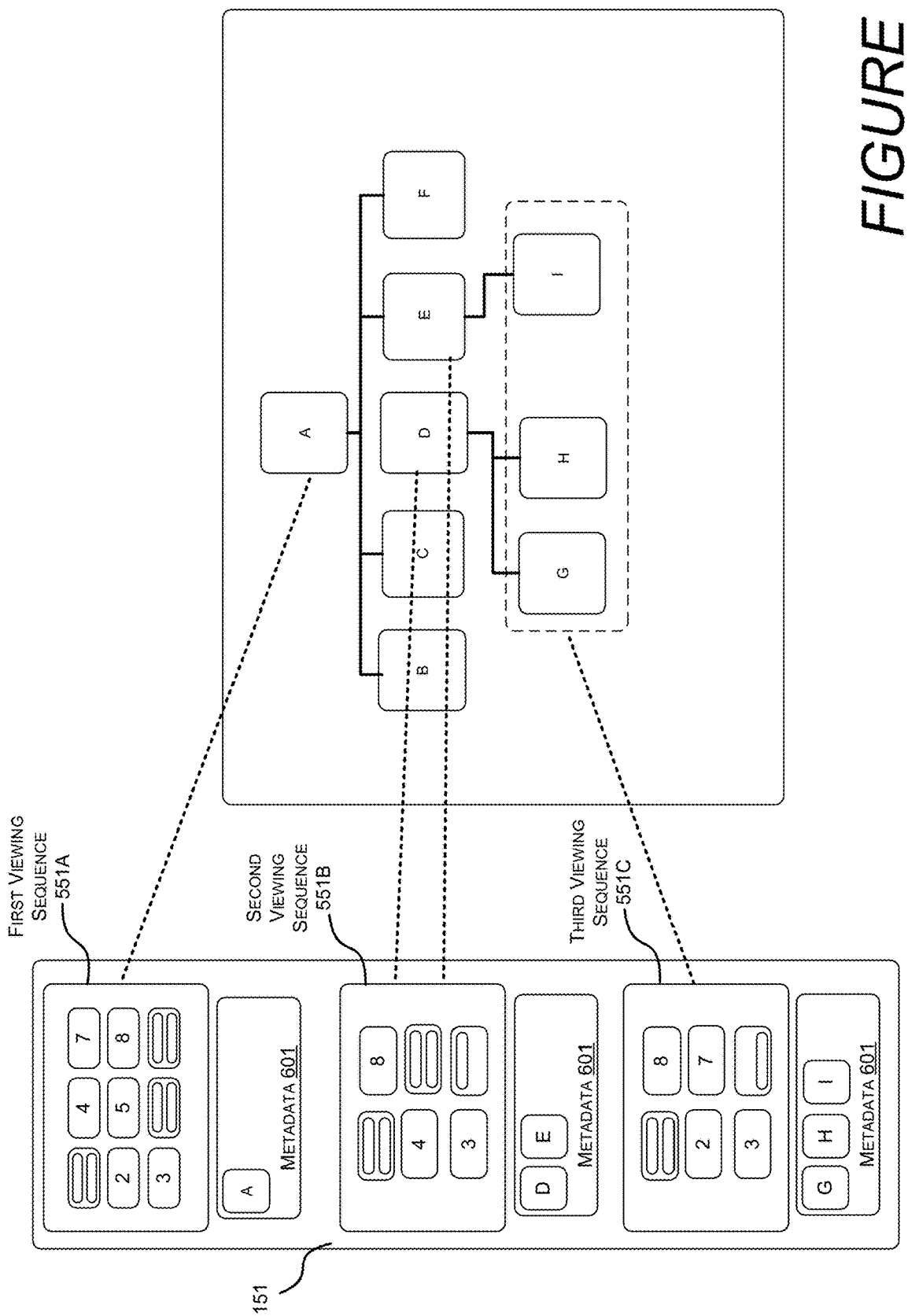
FIG. 6B illustrates associations between user identities and the viewing sequences of FIG. 6A.

FIG. 6B illustrates how each sequence 551 can be associated with identities of individual consumers or groups of consumers. In this example, metadata 601 of the file 151 associates the first viewing sequence 551A with the first consumer 171A. The metadata 601 of the file 151 also associates the second viewing sequence 551B with the fourth consumer 171D and the fifth consumer 171E. In addition, the metadata 601 of the file 151 associates the third viewing sequence 551C with a group of consumers including the seventh consumer 171G, eighth consumer 171H, and the ninth consumer 171I.

FIG. 7A illustrates a viewing sequence that is automatically displayed to the first consumer 171A. As shown, as the first consumer 171A scrolls, paginates, or otherwise progresses through sections of the file, viewing application 142 may display the file sections in the following order: section 1A, section 1B, section 2, section 3, section 4, section 5, section 6A, section 6B, section 7, section 8, section 9A and section 9B.

Figure 7B:
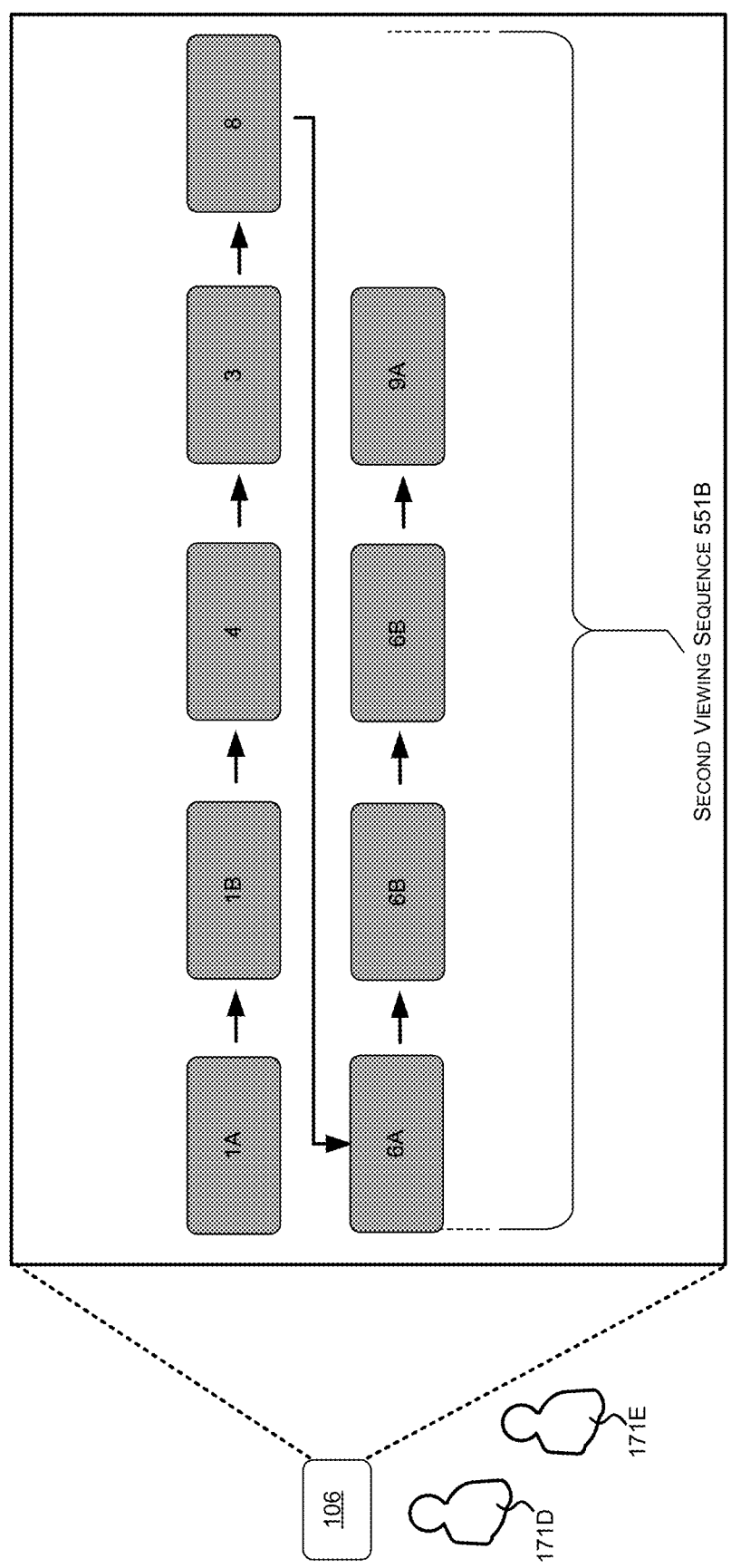
FIG. 7B illustrates a viewing sequence that is automatically displayed to a user associated with a first group of user identities viewing a second set of file sections.

FIG. 7B illustrates a viewing sequence that is automatically displayed to the fourth consumer 171D and the fifth consumer 171E. As shown, as these consumers scroll, paginate, or otherwise progress through sections of the file, a viewing application 142 may display the file sections in the following order: section 1A, section 1B, section 4, section 3, section 8, section 6A, section 6B, and section 9A. The sections that are not defined in the second viewing sequence 551B can be blocked or deemphasized when the file 151 is accessed by the fourth consumer 171D and the fifth consumer 171E.

Figure 7C:
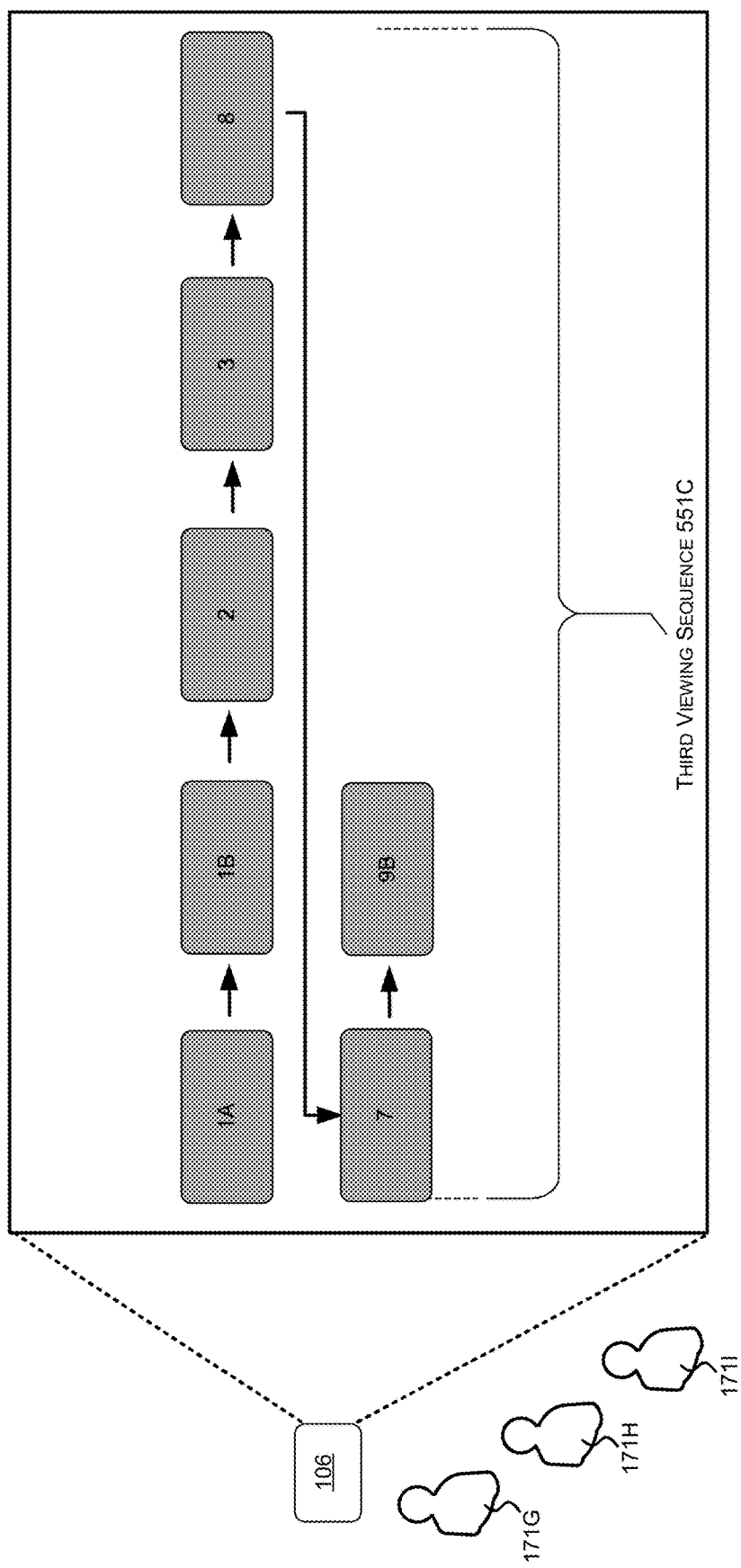
FIG. 7C illustrates a viewing sequence for a user associated with a second group of user identities viewing a third set of file sections.

FIG. 7C illustrates a viewing sequence that is automatically displayed to the seventh consumer 171G, eighth consumer 171H and the ninth consumer 171I. As shown, as these consumers scroll, paginate, or otherwise progress through sections of the file 151, a viewing application 142 may display the file sections in the following order: section 1A, section 1B, section 2, section 3 section 8, section 7, and section 9B. The sections that are not defined in the third viewing sequence 551C can be blocked or deemphasized when the file 151 is accessed by the seventh consumer 171G, eighth consumer 171H and the ninth consumer 171I. In some configurations, consumers that are not defined in the metadata 601 can be blocked from viewing the contents of the file 151. In addition, the file 151 may cause a viewing application to automatically display a default section, e.g., a splash screen or a slide, indicating that the contents of the file 151 is protected when the file 151 is accessed by consumers that are not defined in the metadata 601.

As summarized above, an author 170 of a file can influence a type of view the consumers 171 will experience. For instance, the author 170 can control a type of application a consumer 171 utilizes to view a file 151 based on the consumer's identity. In one illustrative example, one file 151 can cause the execution of a word processing application for a CEO but cause the execution of a presentation program for other employees of an organization. Such configurations can utilize different applications to bring emphasis to certain sections using different formatting features. To facilitate this, the metadata of a file 151 may associate one or more user identities with the preferred application. The techniques disclosed herein also provide a user interface for illustrative associations between user identities and preferred applications.

Figure 8A:
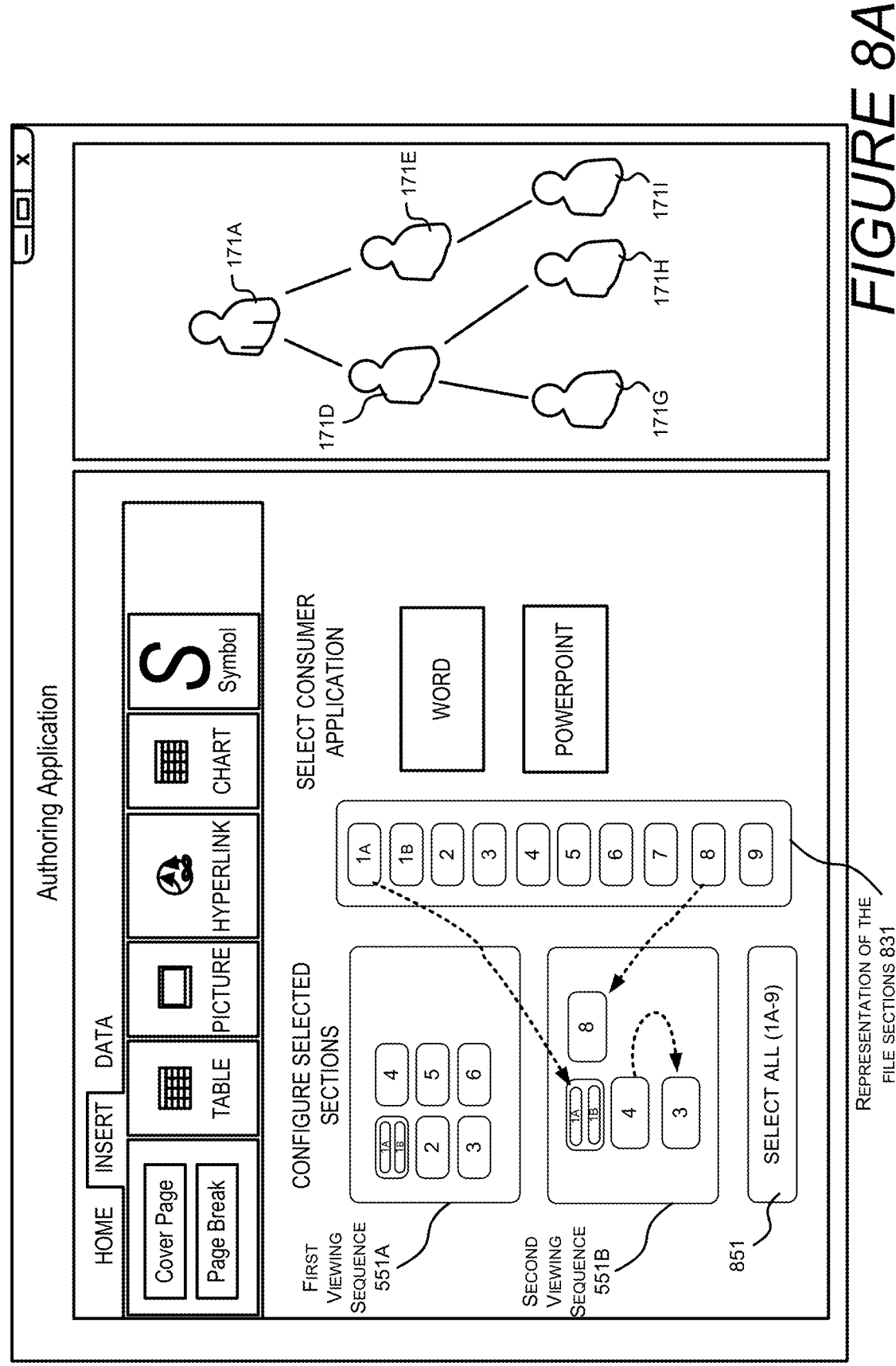
FIG. 8A is a screenshot of a user interface that can be used to map user identities to display sequences of a file and map identities with preferred viewing applications.

FIG. 8A is a screenshot of a user interface that can be used to map user identities to display sequences of a file and map identities with a preferred viewing application. FIG. 8A illustrates a user interface 190 displaying layouts, e.g., sequences, of sections that are selected by an author 170. The user interface 190 can display a representation 831 of the file sections and allow the author 170 to select sections for each viewing sequence 551. The interface 190 can also receive a user input that causes the file to change the order of the selected sections. For instance, as shown, an author 170 can drag and drop representations of different sections to change the order of selected sections. In this case, the author has swapped the order of the third section and the fourth section in the second viewing sequence 551B. In addition, the user interface 190 can enable a user to select all sections of the file 151 by the use of an input, such as the selection of a user interface element 851. Once an order of sections has been established, the author 170 can associate one or more consumers with data defining the order of the sections, e.g., data defining a viewing sequence.

The user interface 190 can also display a list of viewing applications and a list of user identities. Similar to the user interface described above, the author 170 can configure associations between each viewing sequence 551 and one or more user identities. In addition, the author 170 can also configure associations between the user identities and one or more preferred applications. The system can include one or more modules that cause the generation of metadata that defines associations between the user identities and one or more preferred applications. The metadata can cause the execution of the preferred application and/or cause a preferred application to display a viewing sequence associated with a user identity.

Figure 8B:
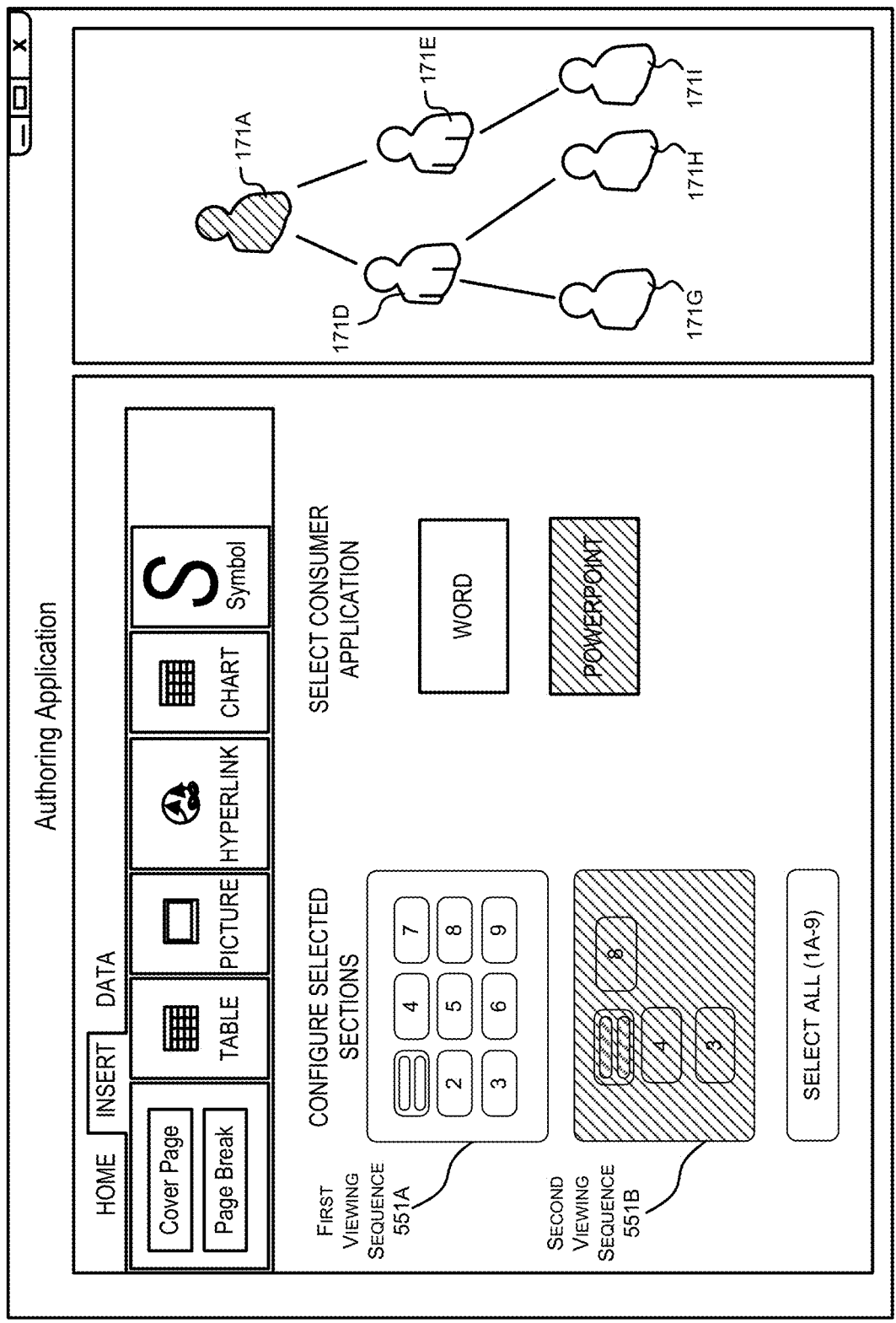
FIG. 8B is a screenshot of a user interface mapping a user identity to a display sequence of a file and mapping the user identity to a preferred viewing application.

FIG. 8B is a screenshot of the user interface 190 illustrating a set of associations established by the author 170. In this example, the author 170 associates the first consumer 171A with the second viewing sequence 551B and a presentation application. Thus, when the first consumer 171A accesses the file 151, the file 151 is configured to cause a computing device to execute a presentation application to display the contents of the file 151 according to the second viewing sequence 551B.

Figure 8C:
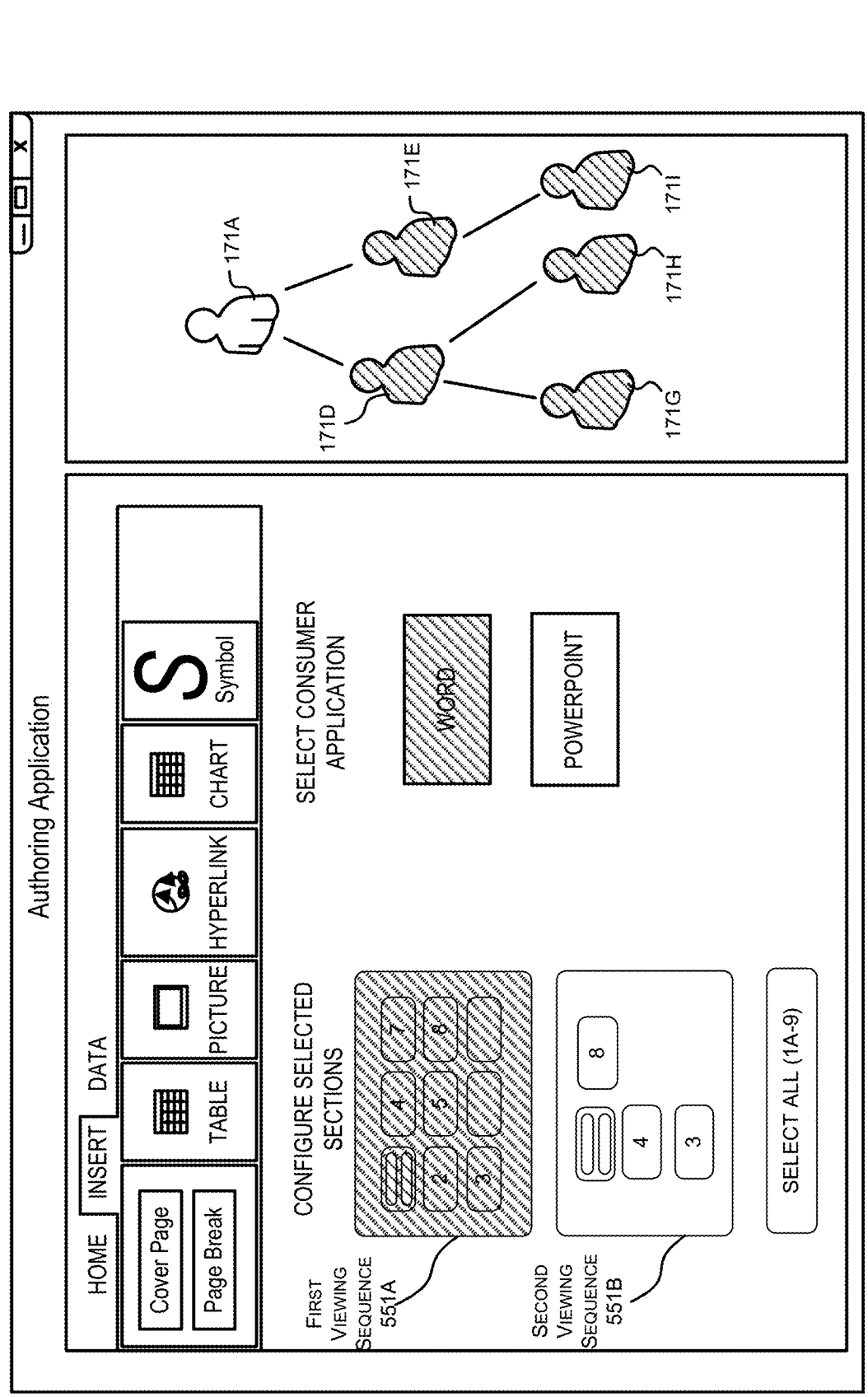
FIG. 8C is a screenshot of a user interface mapping user identities to a display sequence of a file and mapping the user identities to a preferred viewing application for those users.

FIG. 8C is a screenshot of the user interface 190 illustrating another set of associations established by the author 170. In this example, the author 170 associates other consumers (171D, 171E, 171G, 171H, and 171I) with the first viewing sequence 551A and a word processing application. Thus, when these consumers (171D, 171E, 171G, 171H, and 171I) access the file 151, the file 151 is configured to cause a computing device to execute a word processing application or otherwise cause the word processing application to display the contents of the file 151 according to the first viewing sequence 551A.

Figure 9A:
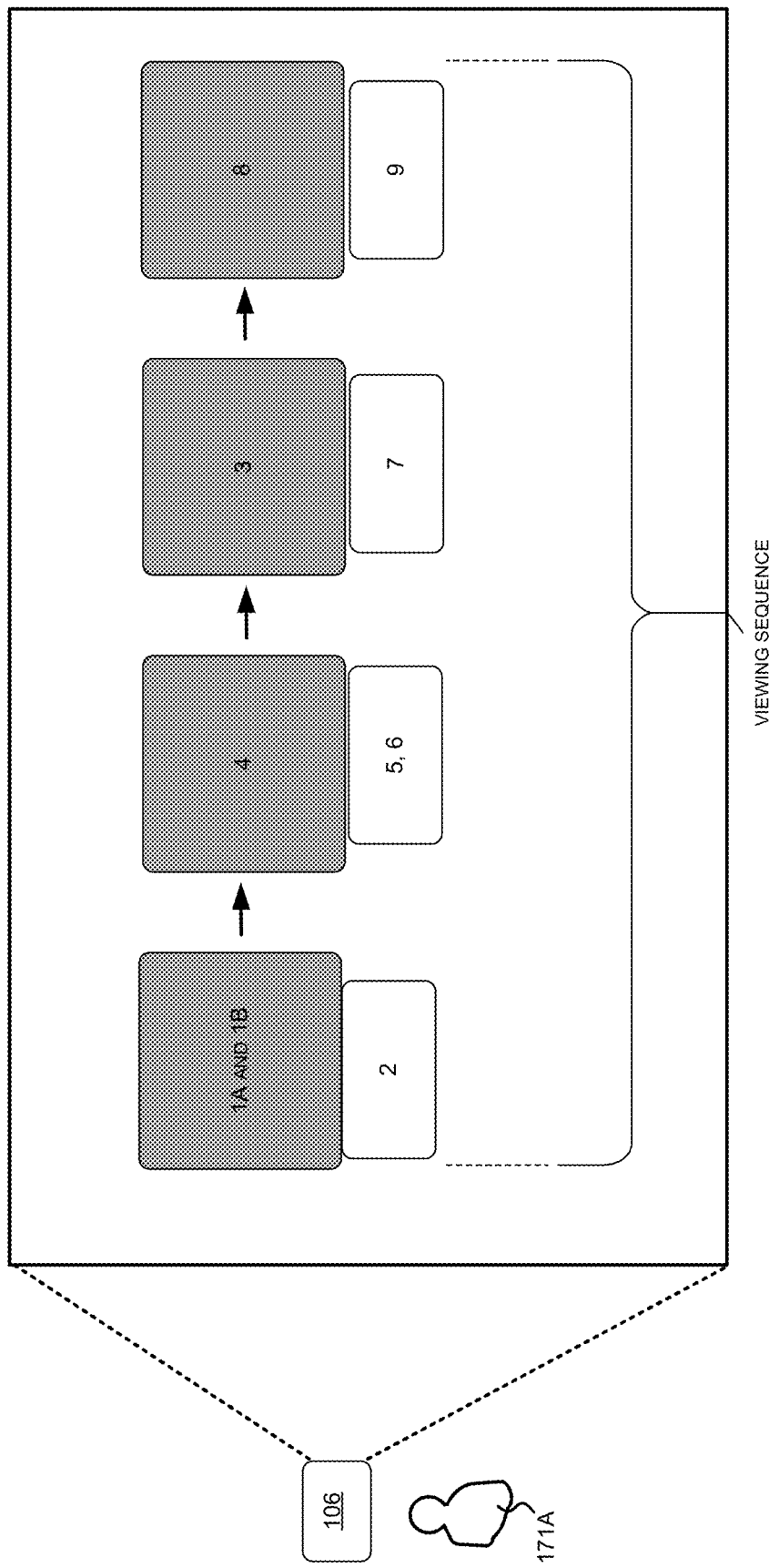
FIG. 9A illustrates sections of a file and associations between a user identity and sections of the file.
Figure 9B:
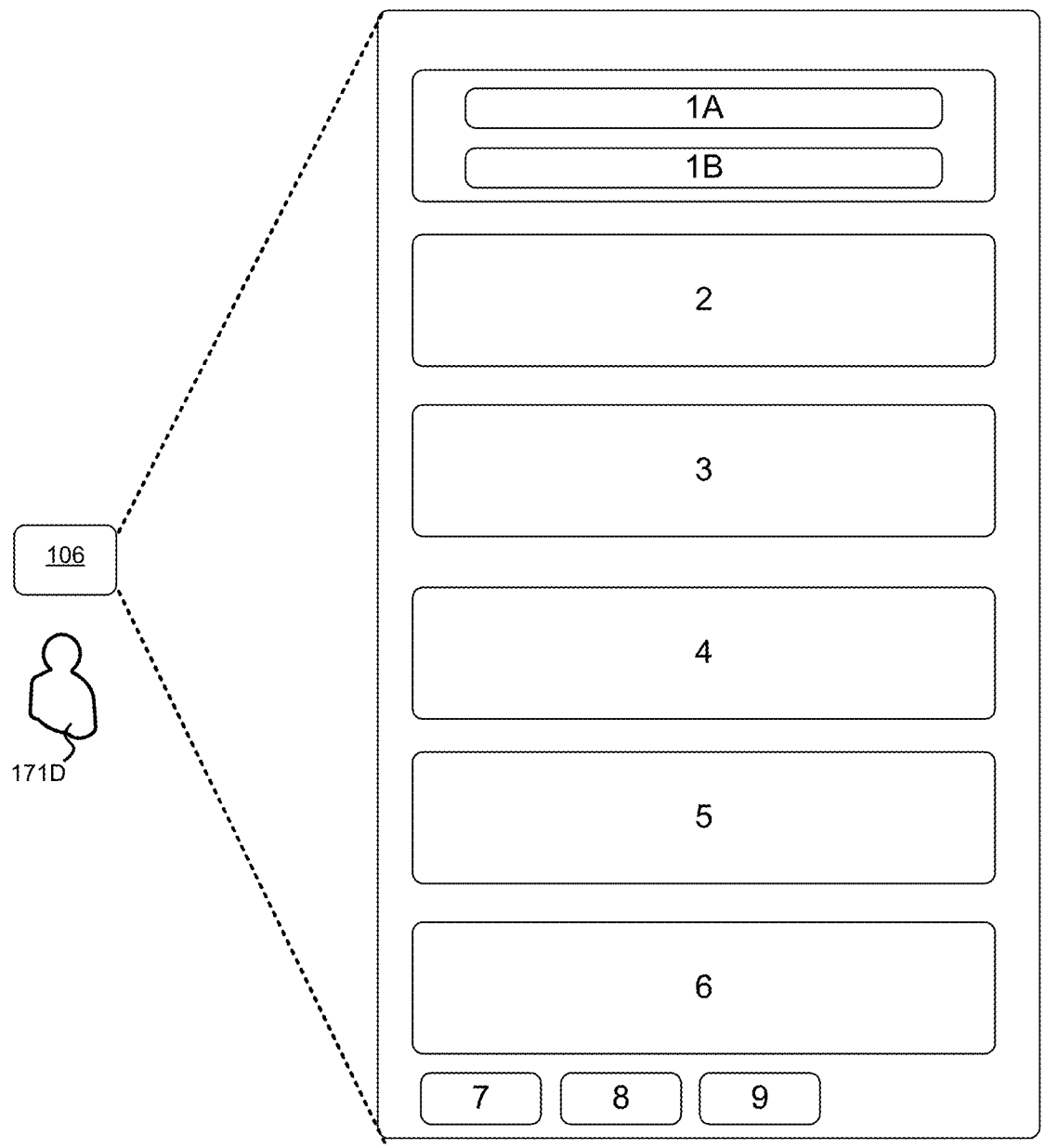
FIG. 9B illustrates a first viewing sequence of the file shown in FIG. 9A that is automatically displayed to a user associated with a first identity, the content of the first viewing sequence is displayed to the user via a presentation application.

FIG. 9A and FIG. 9B are continuations of the current example illustrating how the contents of a file 151 can be displayed in the preferred viewing applications. FIG. 9A illustrates a particular layout that is displayed when the file 151 is viewed by the first consumer 171A. Given the association with a presentation program as the preferred application, the file 151 causes the execution of a presentation application. The file 151 also causes the user interface 195 generated by the presentation application to display the selected sections defined in the second viewing sequence 551B in the primary viewing area of a slide deck. The other sections, i.e., the non-selected sections, are arranged in a notes section of each slide. These examples are provided for illustrative purposes and are not to be construed as limiting. It can be appreciated that many different formatting features can be used to emphasize the selected sections and deemphasize the non-selected sections.

FIG. 9B illustrates a particular layout that may be displayed when the file 151 is accessed by another user, such as the fourth user 171D. Given the association with the preferred application, the file 151 causes the execution of a word processing application. The file 151 causes the user interface generated by the word processing application to display the sections that are selected by the author 170. The remaining sections, i.e., the non-selected sections, can be formatted in a way that deemphasizes the non-selected sections. For instance, the non-selected sections can be displayed as annotations, or the non-selected sections can be inserted as footnotes. Such configurations can utilize different applications to bring emphasis to certain content selected by the author 170.

It should be appreciated that the subject matter described herein may be implemented as a computer-controlled apparatus, a computer process, a computing system, or as an article of manufacture such as a computer-readable storage medium. Among many other benefits, the techniques shown herein improve efficiencies with respect to a wide range of computing resources. For instance, human interaction with a device may be improved, as the use of the techniques disclosed herein enable an author to control what users see from a single document. In addition, improved human interaction improves other computing resources such as processor and network resources, e.g., users only need to share one file over a network instead of multiple versions of a document, such as a PowerPoint file. Reducing the versions of a document can reduce a user's computer interaction, reduce the chances of an inadvertent input, and reduce computational cycles. Other technical effects other than those mentioned herein can also be realized from implementations of the technologies disclosed herein.

Figure 10:
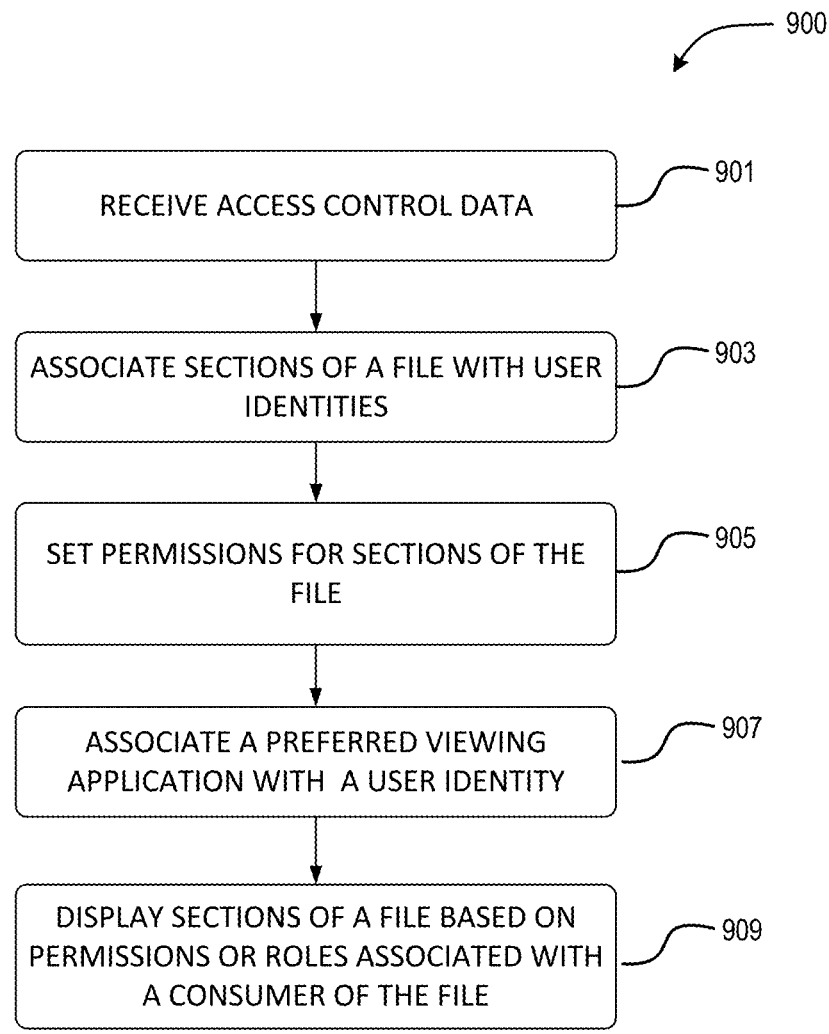
FIG. 10 is a flow diagram showing aspects of a routine for enabling the techniques disclosed herein.

Turning now to FIG. 10, aspects of a routine 900 for enabling aspects of the techniques disclosed herein are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 900 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 900 may be also implemented in many other ways. For example, the routine 900 may be implemented, at least in part, by a processor of another remote computer or a local circuit. In addition, one or more of the operations of the routine 900 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 10, the routine 900 begins at operation 901 where one or more modules of a computing system receive access control data 152. As summarized herein, the access control data 152 enables an author 170 to generate and share a file 151 with a number of consumers 171, and have the individual consumer 171 view different sections of the file 151 depending on permissions associated with each consumer 171. The access control data 152 can define permissions associated with user identities. The access control 152 can include a number of different attributes associated with each user identity. For instance, the access control 152 can define a hierarchy of an organization, titles for each user identity, roles for each user identity, etc.

Next, at operation 903, one or more modules of the computing system can associate sections of a file with user identities. In some configurations, the user interface can display multiple sections of a file and representations of user identities. Functionality of the user interface allows an author to select individual sections of a file and select individual user identities or groups of user identities. The user selection causes a computing device to generate metadata that can be stored within the file. The metadata can associate selected sections of the file with the selected user identities.

Next, at operation 905, one or more modules of the computing system can set permissions for sections of a file. In some configurations, a file can be configured to block a particular user from viewing certain sections of a document. In operation 905, permissions can be established for certain users to prevent them from viewing certain sections of the file.

Next, at operation 907, one or more modules of the computing system can associate a preferred viewing application with a user identity. As described herein, an author can influence a viewing experience of the consumer. In some configurations, the author can associate a preferred viewing application with a particular user identity. Thus, a file can be configured to cause the execution of the preferred viewing application when the file is accessed by a particular consumer. In some configurations, operation 907 can involve generating metadata for a file, wherein the metadata associates the preferred viewing application with one or more user identities.

Next, at operation 909, one or more modules of the computing system can display certain sections of a file based on permissions or roles based on an identity of a consumer of the file. Operation 909 may involve the receipt and processing of access control data for a particular user. When the computing device can verify the identity of a particular user, and that particular user accesses content of the file, certain sections of the file are automatically displayed based on the verification of the user's identity. In operation 909, one or more modules of a computing device can cause an application to be in viewing mode or editing mode. In some configurations, the one or more computing devices 106B-106N associated with a consumer can cause the display of the file 151 in a viewing mode. Thus, the consumer can view the contents of the file 151 presented in one or more viewing sequences. The consumer can also edit the contents of the file 151 by the use of editing tools of an application. The consumer, for instance, can view and edit the contents of a file 151 that is received from an author. Once the consumer is done editing the contents of the file 151, the consumer can cause an application to transition to a viewing mode and the application can present the contents of the file 151 presented in one or more viewing sequences.

Figure 11:
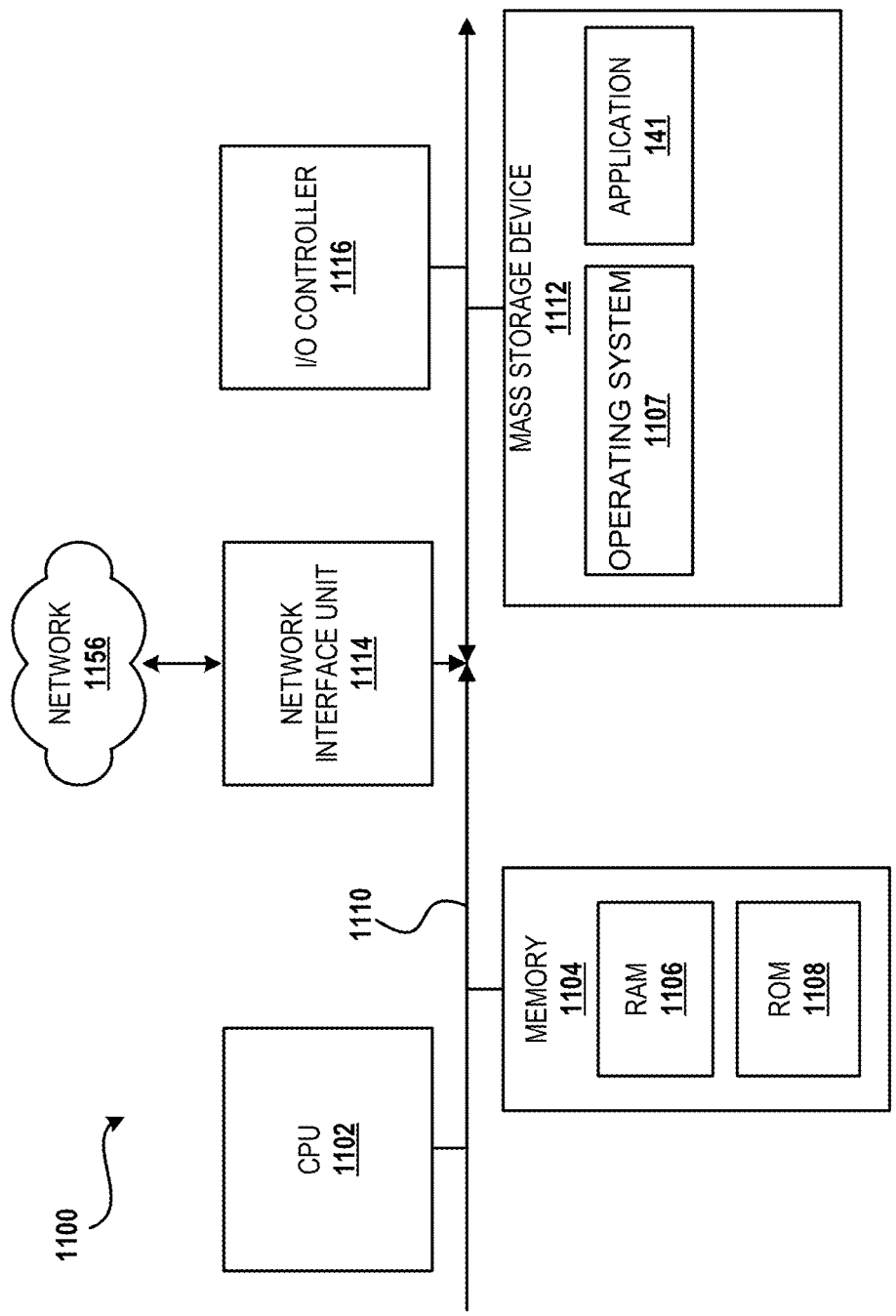
FIG. 11 is a computer architecture diagram illustrating an illustrative computer hardware and software architecture for a computing system capable of implementing aspects of the techniques and technologies presented herein.

FIG. 11 shows additional details of an example computer architecture 1100 for a computer, such as the computing device 106 (FIG. 1), capable of executing the program components described herein. Thus, the computer architecture 1100 illustrated in FIG. 11 illustrates an architecture for a server computer, a mobile phone, a PDA, a smart phone, a desktop computer, a netbook computer, a tablet computer, and/or a laptop computer. The computer architecture 1100 may be utilized to execute any aspects of the software components presented herein.

The computer architecture 1100 illustrated in FIG. 11 includes a central processing unit 1102 ("CPU"), a system memory 1104, including a random access memory 1106 ("RAM") and a read-only memory ("ROM") 1108, and a system bus 1110 that couples the memory 1104 to the CPU 1102. A basic input/output system containing the basic routines that help to transfer information between elements within the computer architecture 1100, such as during startup, is stored in the ROM 1108. The computer architecture 1100 further includes a mass storage device 1112 for storing an operating system 1107, other data, and one or more application programs 141.

The mass storage device 1112 is connected to the CPU 1102 through a mass storage controller (not shown) connected to the bus 1110. The mass storage device 1112 and its associated computer-readable media provide non-volatile storage for the computer architecture 1100. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1100. For purposes of the claims, the phrase "computer storage medium," "computer-readable storage medium" and variations thereof, does not include waves, signals, and/or other transitory and/or intangible communication media, per se.

According to various configurations, the computer architecture 1100 may operate in a networked environment using logical connections to remote computers through the network 1156 and/or another network (not shown). The computer architecture 1100 may connect to the network 1156 through a network interface unit 1114 connected to the bus 1110. It should be appreciated that the network interface unit 1114 also may be utilized to connect to other types of networks and remote computer systems. The computer architecture 1100 also may include an input/output controller 1116 for receiving and processing input from a number of other devices, including a keyboard, mouse, or electronic stylus (not shown in FIG. 11). Similarly, the input/output controller 1116 may provide output to a display screen, a printer, or other type of output device (also not shown in FIG. 11).

It should be appreciated that the software components described herein may, when loaded into the CPU 1102 and executed, transform the CPU 1102 and the overall computer architecture 1100 from a general-purpose computing system into a special-purpose computing system customized to facilitate the functionality presented herein. The CPU 1102 may be constructed from any number of transistors or other discrete circuit elements, which may individually or collectively assume any number of states. More specifically, the CPU 1102 may operate as a finite-state machine, in response to executable instructions contained within the software modules disclosed herein. These computer-executable instructions may transform the CPU 1102 by specifying how the CPU 1102 transitions between states, thereby transforming the transistors or other discrete hardware elements constituting the CPU 1102.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1100 in order to store and execute the software components presented herein. It also should be appreciated that the computer architecture 1100 may include other types of computing devices, including hand-held computers, embedded computer systems, personal digital assistants, and other types of computing devices known to those skilled in the art. It is also contemplated that the computer architecture 1100 may not include all of the components shown in FIG. 11, may include other components that are not explicitly shown in FIG. 11, or may utilize an architecture completely different than that shown in FIG. 11.

Figure 12:
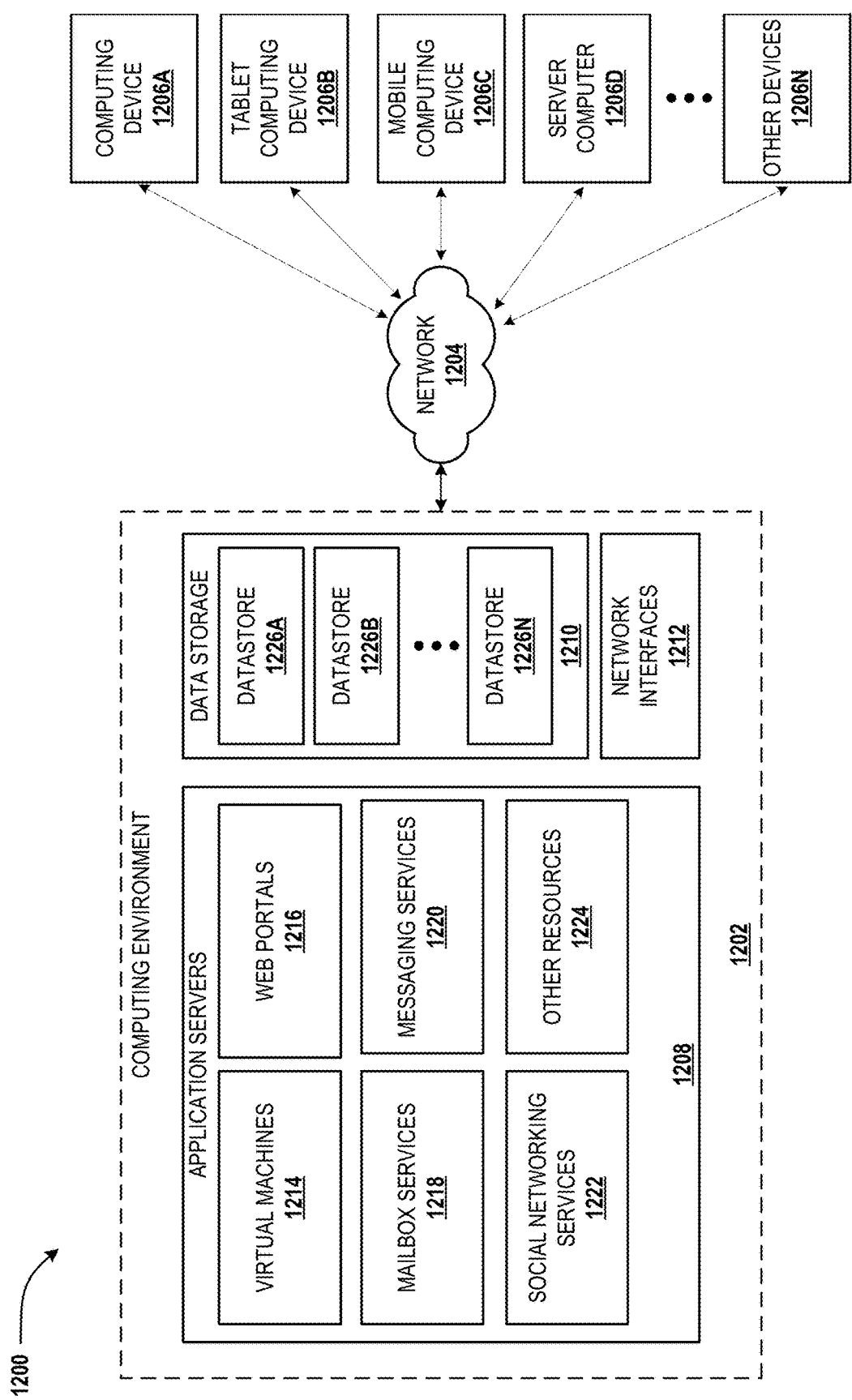
FIG. 12 is a diagram illustrating a distributed computing environment capable of implementing aspects of the techniques and technologies presented herein.

FIG. 12 depicts an illustrative distributed computing environment 1200 capable of executing the software components described herein. Thus, the distributed computing environment 1200 illustrated in FIG. 12 can be utilized to execute any aspects of the software components presented herein. For example, the distributed computing environment 1200 can be utilized to execute aspects of the software components described herein.

According to various implementations, the distributed computing environment 1200 includes a computing environment 1202 operating on, in communication with, or as part of the network 1204. The network 1204 may be or may include the network 1156, described above with reference to FIG. 11. The network 1204 also can include various access networks. One or more client devices 1206A-1206N (hereinafter referred to collectively and/or generically as "clients 1206" and also referred to herein as computing devices 106) can communicate with the computing environment 1202 via the network 1204 and/or other connections (not illustrated in FIG. 12). In one illustrated configuration, the clients 1206 include a computing device 1206A such as a laptop computer, a desktop computer, or other computing device; a slate or tablet computing device ("tablet computing device") 1206B; a mobile computing device 1206C such as a mobile telephone, a smart phone, or other mobile computing device; a server computer 1206D; and/or other devices 1206N. It should be understood that any number of clients 1206 can communicate with the computing environment 1202. Two example computing architectures for the clients 1206 are illustrated and described herein with reference to FIGS. 1, 11 and 13. It should be understood that the illustrated clients 1206 and computing architectures illustrated and described herein are illustrative, and should not be construed as being limited in any way.

In the illustrated configuration, the computing environment 1202 includes application servers 1208, data storage 1210, and one or more network interfaces 1212. According to various implementations, the functionality of the application servers 1208 can be provided by one or more server computers that are executing as part of, or in communication with, the network 1204. The application servers 1208 can host various services, virtual machines, portals, and/or other resources. In the illustrated configuration, the application servers 1208 host one or more virtual machines 1214 for hosting applications or other functionality. According to various implementations, the virtual machines 1214 host one or more applications and/or software modules for enabling the generation, communication and viewing of a file 151. It should be understood that this configuration is illustrative, and should not be construed as being limiting in any way. The application servers 1208 also host or provide access to one or more portals, link pages, Web sites, and/or other information ("Web portals") 1216.

According to various implementations, the application servers 1208 also include one or more mailbox services 1218 and one or more messaging services 1220. The mailbox services 1218 can include electronic mail ("email") services. The mailbox services 1218 also can include various personal information management ("PIM") and presence services including, but not limited to, calendar services, contact management services, collaboration services, and/or other services. The messaging services 1220 can include, but are not limited to, instant messaging services, chat services, forum services, and/or other communication services.

The application servers 1208 also may include one or more social networking services 1222. The social networking services 1222 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1222 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 1222 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 1222 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 1222 are not mentioned herein for the sake of brevity. As such, the above configurations are illustrative, and should not be construed as being limited in any way. According to various implementations, the social networking services 1222 may host one or more applications and/or software modules for providing the functionality described herein. For instance, any one of the application servers 1208 may communicate or facilitate the functionality and features described herein. Also, a social networking application, mail client, messaging client or a browser running on a phone or any other client 1206 may communicate with a networking service 1222 and facilitate the functionality, even in part, described above with respect to FIG. 12. Any device or service depicted herein can be used as a resource for generating, communicating, or viewing a file, including email servers, storage servers, etc. It can be appreciated that any of the resources depicted herein can also provide access control data for the generation and configuration of a file 151. The access control data can be provided by any resource depicted herein for the purposes of verifying a consumer's identity.

As shown in FIG. 12, the application servers 1208 also can host other services, applications, portals, and/or other resources ("other resources") 1224. The other resources 1224 can include, but are not limited to, document sharing, rendering or any other functionality. It thus can be appreciated that the computing environment 1202 can provide integration of the concepts and technologies disclosed herein with various mailbox, messaging, social networking, and/or other services or resources.

As mentioned above, the computing environment 1202 can include the data storage 1210. According to various implementations, the functionality of the data storage 1210 is provided by one or more databases operating on, or in communication with, the network 1204. The functionality of the data storage 1210 also can be provided by one or more server computers configured to host data for the computing environment 1202. The data storage 1210 can include, host, or provide one or more real or virtual datastores 1226A-1226N (hereinafter referred to collectively and/or generically as "datastores 1226"). The datastores 1226 are configured to host data used or created by the application servers 1208 and/or other data. Although not illustrated in FIG. 12, the datastores 1226 also can host or store web page documents, word documents, presentation documents, data structures, algorithms for execution by a recommendation engine, and/or other data utilized by any application program or another module. Aspects of the datastores 1226 may be associated with a service for storing files.

The computing environment 1202 can communicate with, or be accessed by, the network interfaces 1212. The network interfaces 1212 can include various types of network hardware and software for supporting communications between two or more computing devices including, but not limited to, the computing devices and the servers. It should be appreciated that the network interfaces 1212 also may be utilized to connect to other types of networks and/or computer systems.

It should be understood that the distributed computing environment 1200 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1200 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1200 to utilize the functionality described herein for providing the techniques disclosed herein, among other aspects. In one specific example, as summarized above, techniques described herein may be implemented, at least in part, by a web browser application, which works in conjunction with the application servers 1208 of FIG. 12.

Figure 13:
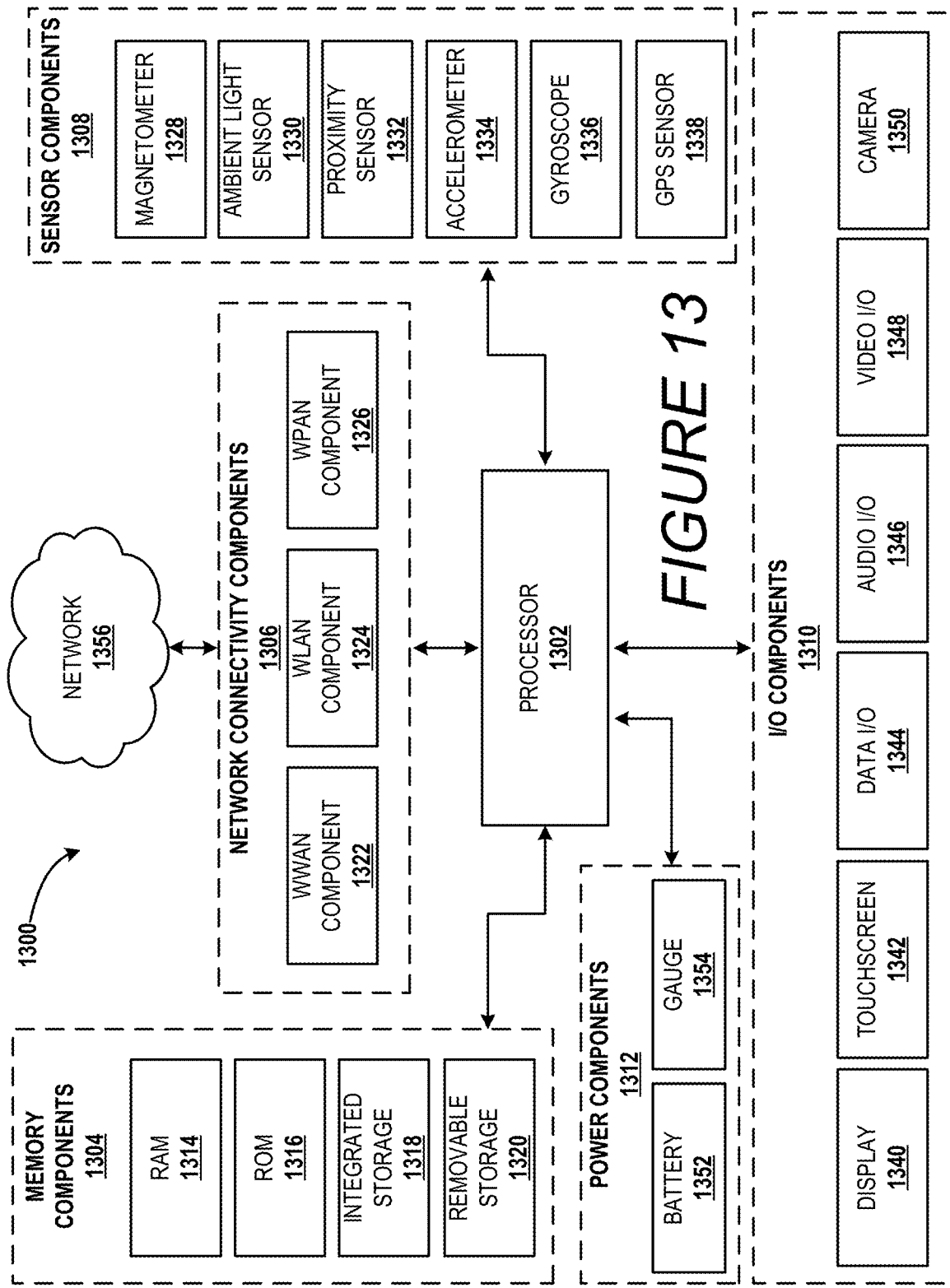
FIG. 13 is a computer architecture diagram illustrating a computing device architecture for a computing device capable of implementing aspects of the techniques and technologies presented herein.

Turning now to FIG. 13, an illustrative computing device architecture 1300 for a computing device that is capable of executing various software components described herein is described for enabling the techniques disclosed herein. The computing device architecture 1300 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1300 is applicable to any of the computing devices shown in FIG. 1 and FIG. 12. Moreover, aspects of the computing device architecture 1300 may be applicable to traditional desktop computers, portable computers (e.g., phones, laptops, notebooks, ultraportables, and netbooks), server computers, and other computer systems, such as described herein with reference to FIG. 1 and FIG. 12. For example, the single touch and multi-touch aspects disclosed herein below may be applied to desktop computers that utilize a touchscreen or some other touch-enabled device, such as a touch-enabled track pad or touch-enabled mouse.

The computing device architecture 1300 illustrated in FIG. 13 includes a processor 1302, memory components 1304, network connectivity components 1306, sensor components 1308, input/output components 1310, and power components 1312. In the illustrated configuration, the processor 1302 is in communication with the memory components 1304, the network connectivity components 1306, the sensor components 1308, the input/output ("I/O") components 1310, and the power components 1312. Although no connections are shown between the individual components illustrated in FIG. 13, the components can interact to carry out device functions. In some configurations, the components are arranged so as to communicate via one or more busses (not shown).

The processor 1302 includes a central processing unit ("CPU") configured to process data, execute computer-executable instructions of one or more application programs, and communicate with other components of the computing device architecture 1300 in order to perform various functionality described herein. The processor 1302 may be utilized to execute aspects of the software components presented herein and, particularly, those that utilize, at least in part, a touch-enabled input.

In some configurations, the processor 1302 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1302 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1302 is, or is included in, a system-on-chip ("SoC") along with one or more of the other components described herein below. For example, the SoC may include the processor 1302, a GPU, one or more of the network connectivity components 1306, and one or more of the sensor components 1308. In some configurations, the processor 1302 is fabricated, in part, utilizing a package-on-package ("PoP") integrated circuit packaging technique. The processor 1302 may be a single core or multi-core processor.

The processor 1302 may be created in accordance with an ARM architecture, available for license from ARM HOLDINGS of Cambridge, United Kingdom. Alternatively, the processor 1302 may be created in accordance with an x86 architecture, such as is available from INTEL CORPORATION of Mountain View, Calif. and others. In some configurations, the processor 1302 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1304 include a random access memory ("RAM") 1314, a read-only memory ("ROM") 1316, an integrated storage memory ("integrated storage") 1318, and a removable storage memory ("removable storage") 1320. In some configurations, the RAM 1314 or a portion thereof, the ROM 1316 or a portion thereof, and/or some combination of the RAM 1314 and the ROM 1316 is integrated in the processor 1302. In some configurations, the ROM 1316 is configured to store a firmware, an operating system or a portion thereof (e.g., operating system kernel), and/or a bootloader to load an operating system kernel from the integrated storage 1318 and/or the removable storage 1320.

The integrated storage 1318 can include a solid-state memory, a hard disk, or a combination of solid-state memory and a hard disk. The integrated storage 1318 may be soldered or otherwise connected to a logic board upon which the processor 1302 and other components described herein also may be connected. As such, the integrated storage 1318 is integrated in the computing device. The integrated storage 1318 is configured to store an operating system or portions thereof, application programs, data, and other software components described herein.

The removable storage 1320 can include a solid-state memory, a hard disk, or a combination of solid-state memory and a hard disk. In some configurations, the removable storage 1320 is provided in lieu of the integrated storage 1318. In other configurations, the removable storage 1320 is provided as additional optional storage. In some configurations, the removable storage 1320 is logically combined with the integrated storage 1318 such that the total available storage is made available as a total combined storage capacity. In some configurations, the total combined capacity of the integrated storage 1318 and the removable storage 1320 is shown to a user instead of separate storage capacities for the integrated storage 1318 and the removable storage 1320.

The removable storage 1320 is configured to be inserted into a removable storage memory slot (not shown) or other mechanism by which the removable storage 1320 is inserted and secured to facilitate a connection over which the removable storage 1320 can communicate with other components of the computing device, such as the processor 1302. The removable storage 1320 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1304 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1306 include a wireless wide area network component ("WWAN component") 1322, a wireless local area network component ("WLAN component") 1324, and a wireless personal area network component ("WPAN component") 1326. The network connectivity components 1306 facilitate communications to and from the network 1356 or another network, which may be a WWAN, a WLAN, or a WPAN. Although only the network 1356 is illustrated, the network connectivity components 1306 may facilitate simultaneous communication with multiple networks, including the network 604 of FIG. 6. For example, the network connectivity components 1306 may facilitate simultaneous communications with multiple networks via one or more of a WWAN, a WLAN, or a WPAN.

The network 1356 may be or may include a WWAN, such as a mobile telecommunications network utilizing one or more mobile telecommunications technologies to provide voice and/or data services to a computing device utilizing the computing device architecture 1300 via the WWAN component 1322. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 1356 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1356 may be configured to provide voice and/or data communications with any combination of the above technologies. The network 1356 may be configured to or adapted to provide voice and/or data communications in accordance with future generation technologies.

In some configurations, the WWAN component 1322 is configured to provide dual-multi-mode connectivity to the network 1356. For example, the WWAN component 1322 may be configured to provide connectivity to the network 1356, wherein the network 1356 provides service via GSM and UMTS technologies, or via some other combination of technologies. Alternatively, multiple WWAN components 1322 may be utilized to perform such functionality, and/or provide additional functionality to support other non-compatible technologies (i.e., incapable of being supported by a single WWAN component). The WWAN component 1322 may facilitate similar connectivity to multiple networks (e.g., a UMTS network and an LTE network).

The network 1356 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1324 is configured to connect to the network 1356 via the WI-FI access points. Such connections may be secured via various encryption technologies including, but not limited to, WI-FI Protected Access ("WPA"), WPA2, Wired Equivalent Privacy ("WEP"), and the like.

The network 1356 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1326 is configured to facilitate communications with other devices, such as peripherals, computers, or other computing devices via the WPAN.

The sensor components 1308 include a magnetometer 1328, an ambient light sensor 1330, a proximity sensor 1332, an accelerometer 1334, a gyroscope 1336, and a Global Positioning System sensor ("GPS sensor") 1338. It is contemplated that other sensors, such as, but not limited to, temperature sensors or shock detection sensors, also may be incorporated in the computing device architecture 1300.

The magnetometer 1328 is configured to measure the strength and direction of a magnetic field. In some configurations the magnetometer 1328 provides measurements to a compass application program stored within one of the memory components 1304 in order to provide a user with accurate directions in a frame of reference including the cardinal directions, north, south, east, and west. Similar measurements may be provided to a navigation application program that includes a compass component. Other uses of measurements obtained by the magnetometer 1328 are contemplated.

The ambient light sensor 1330 is configured to measure ambient light. In some configurations, the ambient light sensor 1330 provides measurements to an application program stored within one of the memory components 1304 in order to automatically adjust the brightness of a display (described below) to compensate for low-light and high-light environments. Other uses of measurements obtained by the ambient light sensor 1330 are contemplated.

The proximity sensor 1332 is configured to detect the presence of an object or thing in proximity to the computing device without direct contact. In some configurations, the proximity sensor 1332 detects the presence of a user's body (e.g., the user's face) and provides this information to an application program stored within one of the memory components 1304 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity information as detected by the proximity sensor 1332 are contemplated.

The accelerometer 1334 is configured to measure proper acceleration. In some configurations, output from the accelerometer 1334 is used by an application program as an input mechanism to control some functionality of the application program. For example, the application program may be a video game in which a character, a portion thereof, or an object is moved or otherwise manipulated in response to input received via the accelerometer 1334. In some configurations, output from the accelerometer 1334 is provided to an application program for use in switching between landscape and portrait modes, calculating coordinate acceleration, or detecting a fall. Other uses of the accelerometer 1334 are contemplated.

The gyroscope 1336 is configured to measure and maintain orientation. In some configurations, output from the gyroscope 1336 is used by an application program as an input mechanism to control some functionality of the application program. For example, the gyroscope 1336 can be used for accurate recognition of movement within a 3D environment of a video game application or some other application. In some configurations, an application program utilizes output from the gyroscope 1336 and the accelerometer 1334 to enhance control of some functionality of the application program. Other uses of the gyroscope 1336 are contemplated.

The GPS sensor 1338 is configured to receive signals from GPS satellites for use in calculating a location. The location calculated by the GPS sensor 1338 may be used by any application program that requires or benefits from location information. For example, the location calculated by the GPS sensor 1338 may be used with a navigation application program to provide directions from the location to a destination or directions from the destination to the location. Moreover, the GPS sensor 1338 may be used to provide location information to an external location-based service, such as E911 service. The GPS sensor 1338 may obtain location information generated via WI-FI, WIMAX, and/or cellular triangulation techniques utilizing one or more of the network connectivity components 1306 to aid the GPS sensor 1338 in obtaining a location fix. The GPS sensor 1338 may also be used in Assisted GPS ("A-GPS") systems. The GPS sensor 1338 can also operate in conjunction with other components, such as the processor 1302, to generate positioning data for the computing device 1300.

The I/O components 1310 include a display 1340, a touchscreen 1342, a data I/O interface component ("data I/O") 1344, an audio I/O interface component ("audio I/O") 1346, a video I/O interface component ("video I/O") 1348, and a camera 1350. In some configurations, the display 1340 and the touchscreen 1342 are combined. In some configurations two or more of the data I/O component 1344, the audio I/O component 1346, and the video I/O component 1348 are combined. The I/O components 1310 may include discrete processors configured to support the various interfaces described below, or may include processing functionality built-in to the processor 1302.

The display 1340 is an output device configured to present information in a visual form. In particular, the display 1340 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1340 is a liquid crystal display ("LCD") utilizing any active or passive matrix technology and any backlighting technology (if used). In some configurations, the display 1340 is an organic light emitting diode ("OLED") display. Other display types are contemplated.

The touchscreen 1342, also referred to herein as a "touch-enabled screen," is an input device configured to detect the presence and location of a touch. The touchscreen 1342 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1342 is incorporated on top of the display 1340 as a transparent layer to enable a user to use one or more touches to interact with objects or other information presented on the display 1340. In other configurations, the touchscreen 1342 is a touch pad incorporated on a surface of the computing device that does not include the display 1340. For example, the computing device may have a touchscreen incorporated on top of the display 1340 and a touch pad on a surface opposite the display 1340.

In some configurations, the touchscreen 1342 is a single-touch touchscreen. In other configurations, the touchscreen 1342 is a multi-touch touchscreen. In some configurations, the touchscreen 1342 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1342. As such, a developer may create gestures that are specific to a particular application program.

In some configurations, the touchscreen 1342 supports a tap gesture in which a user taps the touchscreen 1342 once on an item presented on the display 1340. The tap gesture may be used for various reasons including, but not limited to, opening or launching whatever the user taps. In some configurations, the touchscreen 1342 supports a double tap gesture in which a user taps the touchscreen 1342 twice on an item presented on the display 1340. The double tap gesture may be used for various reasons including, but not limited to, zooming in or zooming out in stages. In some configurations, the touchscreen 1342 supports a tap and hold gesture in which a user taps the touchscreen 1342 and maintains contact for at least a pre-defined time. The tap and hold gesture may be used for various reasons including, but not limited to, opening a context-specific menu.

In some configurations, the touchscreen 1342 supports a pan gesture in which a user places a finger on the touchscreen 1342 and maintains contact with the touchscreen 1342 while moving the finger on the touchscreen 1342. The pan gesture may be used for various reasons including, but not limited to, moving through screens, images, or menus at a controlled rate. Multiple finger pan gestures are also contemplated. In some configurations, the touchscreen 1342 supports a flick gesture in which a user swipes a finger in the direction the user wants the screen to move. The flick gesture may be used for various reasons including, but not limited to, scrolling horizontally or vertically through menus or pages. In some configurations, the touchscreen 1342 supports a pinch and stretch gesture in which a user makes a pinching motion with two fingers (e.g., thumb and forefinger) on the touchscreen 1342 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 1342. As such, the above gestures should be understood as being illustrative and should not be construed as being limiting in any way.

The data I/O interface component 1344 is configured to facilitate input of data to the computing device and output of data from the computing device. In some configurations, the data I/O interface component 1344 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1346 is configured to provide audio input and/or output capabilities to the computing device. In some configurations, the audio I/O interface component 1346 includes a microphone configured to collect audio signals. In some configurations, the audio I/O interface component 1346 includes a headphone jack configured to provide connectivity for headphones or other external speakers. In some configurations, the audio I/O interface component 1346 includes a speaker for the output of audio signals. In some configurations, the audio I/O interface component 1346 includes an optical audio cable out.

The video I/O interface component 1348 is configured to provide video input and/or output capabilities to the computing device. In some configurations, the video I/O interface component 1348 includes a video connector configured to receive video as input from another device (e.g., a video media player such as a DVD or BLURAY player) or send video as output to another device (e.g., a monitor, a television, or some other external display). In some configurations, the video I/O interface component 1348 includes a High-Definition Multimedia Interface ("HDMI"), mini-HDMI, micro-HDMI, DisplayPort, or proprietary connector to input/output video content. In some configurations, the video I/O interface component 1348 or portions thereof is combined with the audio I/O interface component 1346 or portions thereof.

The camera 1350 can be configured to capture still images and/or video. The camera 1350 may utilize a charge coupled device ("CCD") or a complementary metal oxide semiconductor ("CMOS") image sensor to capture images. In some configurations, the camera 1350 includes a flash to aid in taking pictures in low-light environments. Settings for the camera 1350 may be implemented as hardware or software buttons.

Although not illustrated, one or more hardware buttons may also be included in the computing device architecture 1300. The hardware buttons may be used for controlling some operational aspects of the computing device. The hardware buttons may be dedicated buttons or multi-use buttons. The hardware buttons may be mechanical or sensor-based.

The illustrated power components 1312 include one or more batteries 1352, which can be connected to a battery gauge 1354. The batteries 1352 may be rechargeable or disposable. Rechargeable battery types include, but are not limited to, lithium polymer, lithium ion, nickel cadmium, and nickel metal hydride. Each of the batteries 1352 may be made of one or more cells.

The battery gauge 1354 can be configured to measure battery parameters such as current, voltage, and temperature. In some configurations, the battery gauge 1354 is configured to measure the effect of a battery's discharge rate, temperature, age and other factors to predict remaining life within a certain percentage of error. In some configurations, the battery gauge 1354 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1312 may also include a power connector, which may be combined with one or more of the aforementioned I/O components 1310. The power components 1312 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for configuring a file comprising a plurality of file sections, the method comprising:
   receiving, at a computing device, access control data, wherein the access control data defines access permissions that enable user identities to access one or more file sections from the file;
   receiving input data indicating an association between a first set of file sections and a first user identity and an association between a second set of file sections and a second user identity;
   generating file metadata defining the association between the first set of file sections and the first user identity and defining the association between the second set of file sections and the second user identity, the file metadata further configured to cause a selection of a type of a viewing application, wherein a first type is selected for the first user identity and a second type is selected for the second user identity, the file metadata, using the access control data, configured to cause the viewing application to
   display, from the file using the association between the first user identity and the first set of file sections defined in the file metadata, the first set of file sections when the file is accessed by a first user associated with the first user identity, or
   display, from the file using the association between the second user identity and the second set of file sections defined in the file metadata, the second set of file sections when the file is accessed by a second user associated with the second user identity.

2. The method of claim 1, further comprising:
   displaying user interface elements representing the first set of file sections;
   displaying user interface elements representing the first user identity; and
   in response to receiving the user input indicating the association between the first set of file sections and the first user identity, generating a first graphical indicator bringing focus to the association between the first set of file sections and the first user identity.

3. The method of claim 1, wherein the file metadata causes the viewing application to prevent a display of file sections that are not defined in the first set of file sections when the file is accessed by the first user associated with the first user identity.

4. The method of claim 1, wherein the file metadata causes the viewing application to deemphasize a display of file sections that are not defined in the first set of file sections when the file is accessed by the first user associated with the first user identity.

5. The method of claim 1, further comprising:
   receiving additional input data indicating an association between a first viewing application and the first user identity and an association between a second viewing application and the second user identity; and
   configuring the file metadata to define the association between the first viewing application and the first user identity and an association between the second viewing application and the second user identity, wherein the file metadata is configured to cause the computing device to
   display the first set of file sections in a user interface of the first viewing application when the file is accessed by the first user associated with the first user identity, or
   display the second set of file sections in a user interface of the second viewing application when the file is accessed by the second user associated with the second user identity.

6. The method of claim 1, further comprising:
   receiving additional input data indicating an association between a first viewing application and the first user identity; and
   configuring the file metadata to define the association between the first viewing application and the first user identity, wherein the file metadata is configured to cause the computing device to display a first set of file sections in a user interface of the first viewing application when the file is accessed by the first user associated with the first user identity.

7. The method of claim 1, further comprising:
   receiving additional input data indicating an order of the file sections in the first set of file sections and an order of the file sections in the second set of file sections; and
   configuring the file metadata to define a first order of the file sections in the first set of file sections and define a second order of the file sections in the second set of file sections, the file metadata configured to cause the viewing application to display the first set of file sections in a sequence following the first order when the file is accessed by the first user associated with the first user identity, or display the second set of file sections in a sequence following the second order when the file is accessed by the second user associated with the second user identity.

8. The method of claim 1, wherein a plurality of file sections includes the first set of file sections and other file sections, the file metadata configured to cause the viewing application to display the other file sections in a format that deemphasizes the content of the other sections in comparison to the display of the first set of file sections.

9. The method of claim 1, wherein the first type of the viewing application includes a word processing application and the second type of the viewing application includes a presentation program.

10. A method for viewing a file on a computing device, comprising:

receiving access control data, wherein the access control data defines access permissions that enable a user identity to access one or more file sections from the file;

verifying user credentials associated with the user identity;

receiving the file, the file comprising a set of file sections and other sections and metadata defining a preferred application selection for a viewing application, wherein the set of file sections is associated with the user identity, and wherein the file, using the access control data, causes the preferred application to display, from the file using an association between the set of file sections and the user identity defined in metadata, the set of file sections when the file is accessed by the user associated with the user identity, and blocking or de-emphasizing a display of the other sections.

11. The method of claim 10, wherein the file comprises metadata defining a first order of file sections associated with the user identity and a second order of file sections associated with at least one other user identity, wherein the metadata causes a viewing application to display the first set of file sections in a sequence following the first order when the file is accessed by the user associated with the user identity.

12. The method of claim 10, wherein the metadata defines an association between the user identity and the set of file sections, wherein the set of file sections is displayed on a first display device associated with the first user identity.

13. A system comprising:

one or more processing units; and a computer-readable storage medium having encoded thereon computer-executable instructions to cause the one or more processing units to receive access control data, wherein the access control data defines user identities;

receive input data indicating an association between a first set of file sections and a first user identity and an association between a second set of file sections and a second user identity access to one or more file sections from a file;

generate file metadata defining the association between the first set of file sections and the first user identity and defining the association between the second set of file sections and the second user identity, the file metadata further configured to cause a selection of a type of a viewing application, wherein a first type is selected for the first user identity and a second type is selected for the second user identity, the file metadata, using the access control data, configured to cause the viewing application to display, from the file using the association between the first user identity and the first set of file sections defined in the file metadata, the first set of file sections when the file is accessed by a first user associated with the first user identity, or display, from the file using the association between the second user identity and the second set of file sections defined in the file metadata, the second set of file sections when the file is accessed by a second user associated with the second user identity.

14. The system of claim 13, wherein the instructions further cause the one or more processing units to:

display user interface elements representing the first set of file sections;

display user interface elements representing the first user identity; and in response to receiving the input indicating the association between the first set of file sections and the first user identity, generate a first graphical indicator bringing focus to the association between the first set of file sections and the first user identity.

15. The system of claim 13, wherein the access control data defines roles for individual user identities, wherein the file causes a viewing application to:

display the first set of file sections when the file is accessed by one or more identities associated with a first role; or display the second set of file sections when the file is accessed by one or more identities associated with a second role.

16. The system of claim 13, wherein the instructions further cause the one or more processing units to:

receive additional input data indicating an association between a first viewing application and the first user identity and an association between a second viewing application and the second user identity; and configure the file metadata to define the association between the first viewing application and the first user identity and an association between a second viewing application and the second user identity, wherein the file metadata is configured to cause the processing units to:

display the first set of file sections in the user interface of the first viewing application when the file is accessed by the first user associated with the first user identity, or display the second set of file sections in the user interface of the second viewing application when the file is accessed by the second user associated with the second user identity.

17. The system of claim 13, wherein the instructions further cause the one or more processing units to:

receive additional input data indicating an association between a first viewing application and the first user identity; and configure the file metadata to define the association between the first viewing application and the first user identity, wherein the file metadata is configured to cause the processing units to display the first set of file sections in a user interface of the first viewing application when the file is accessed by the first user associated with the first user identity.

18. The system of claim 13, wherein the instructions further cause the one or more processing units to:
receive additional input data indicating an order of the file sections in the first set of file sections and an order of the file sections in the second set of file sections; and
configure the file metadata to define the first order of the file sections in the first set of file sections and define the second order of the file sections in the second set of file sections, the file metadata configured to cause the viewing application to
display the first set of file sections in a sequence following the first order when the file is accessed by the first user associated with the first user identity, or
display the second set of file sections in a sequence following the second order when the file is accessed by the second user associated with the second user identity.

* * * * *